(12) United States Patent
Sakai et al.

(10) Patent No.: US 7,956,940 B2
(45) Date of Patent: Jun. 7, 2011

(54) DISPLAY SYSTEM

(75) Inventors: Takehiko Sakai, Matsusaka (JP);
Tsuyoshi Okazaki, Nara (JP);
Katsuhiko Morishita, Matsusaka (JP);
Yoshiharu Kataoka, Tsu (JP);
Chikanori Tsukamura, Tsu (JP);
Takahiro Sasaki, Taki-gun (JP); Dai Chiba, Matsusaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 253 days.

(21) Appl. No.: 12/294,146

(22) PCT Filed: Dec. 21, 2006

(86) PCT No.: PCT/JP2006/325484
§ 371 (c)(1),
(2), (4) Date: Sep. 23, 2008

(87) PCT Pub. No.: WO2007/138732
PCT Pub. Date: Dec. 6, 2007

(65) Prior Publication Data
US 2009/0102989 A1   Apr. 23, 2009

(30) Foreign Application Priority Data
May 31, 2006  (JP) .................................. 2006-152825

(51) Int. Cl.
G02F 1/1335   (2006.01)
G02F 1/1333   (2006.01)
F21V 33/00    (2006.01)
F21V 7/04     (2006.01)
A47F 3/00     (2006.01)

(52) U.S. Cl. .................. 349/12; 349/1; 349/11; 349/17; 349/58; 362/85; 362/561; 902/1; 902/5; 902/6; 902/30; 902/31; 902/35

(58) Field of Classification Search .............. 902/1, 4–6, 902/30, 31, 35, 34; 362/85, 561; 349/11, 349/12, 17
See application file for complete search history.

(56) References Cited

U.S. PATENT DOCUMENTS

| | | | | |
|---|---|---|---|---|
| 4,942,464 A | * | 7/1990 | Milatz | 348/150 |
| 5,677,747 A | * | 10/1997 | Ishikawa et al. | 349/76 |
| 5,717,566 A | * | 2/1998 | Tao | 361/679.27 |
| 5,780,825 A | * | 7/1998 | Sato et al. | 235/379 |
| 5,812,226 A | * | 9/1998 | Izumi et al. | 349/73 |

(Continued)

FOREIGN PATENT DOCUMENTS
CN   1632659 A   6/2005
(Continued)

OTHER PUBLICATIONS

International Search Report for PCT/JP2007/325484 mailed Mar. 13, 2007.

(Continued)

*Primary Examiner* — Rhonda S Peace
(74) *Attorney, Agent, or Firm* — Nixon & Vanderhye P.C.

(57) ABSTRACT

A display system includes a liquid crystal display (10) including a backlight (3), a liquid crystal display panel (1), and a viewing angle control panel (2) for controlling the viewing angle of the display panel (1), the display system causing the amount of external light reflected by the liquid crystal display (10) to be relatively larger than the amount of light leaked from the backlight (3) onto the liquid crystal display panel (1). This provides a display system having an enhanced blocking effect.

17 Claims, 17 Drawing Sheets

U.S. PATENT DOCUMENTS

| | | | |
|---|---|---|---|
| 5,877,829 A | 3/1999 | Okamoto et al. | |
| 6,000,806 A * | 12/1999 | Dallman | 362/85 |
| 6,061,666 A * | 5/2000 | Do et al. | 705/43 |
| 6,199,754 B1 * | 3/2001 | Epstein | 235/379 |
| 6,211,930 B1 * | 4/2001 | Sautter et al. | 349/66 |
| 6,385,139 B1 | 5/2002 | Arikawa et al. | |
| 6,474,823 B1 * | 11/2002 | Agata et al. | 362/26 |
| 6,567,137 B1 * | 5/2003 | Moon | 349/61 |
| 6,626,552 B2 * | 9/2003 | Uehara et al. | 362/85 |
| 6,685,086 B1 * | 2/2004 | Mackenzie et al. | 235/379 |
| 6,726,101 B1 * | 4/2004 | McIntyre et al. | 235/382 |
| 6,966,486 B2 * | 11/2005 | Ferraro | 235/379 |
| 6,983,879 B2 * | 1/2006 | Ramachandran et al. | 235/379 |
| 7,068,336 B2 * | 6/2006 | Oh et al. | 349/123 |
| 7,468,770 B2 * | 12/2008 | Okumura | 349/123 |
| 2001/0026632 A1 * | 10/2001 | Tamai | 382/116 |
| 2002/0084915 A1 * | 7/2002 | Budnovitch | 340/932.2 |
| 2002/0139842 A1 * | 10/2002 | Swaine | 235/379 |
| 2002/0176164 A1 | 11/2002 | Motomura et al. | |
| 2004/0173671 A1 * | 9/2004 | Ferraro | 235/379 |
| 2005/0029340 A1 * | 2/2005 | Ferraro | 235/379 |
| 2005/0129273 A1 * | 6/2005 | Pryor | 382/103 |
| 2005/0190318 A1 | 9/2005 | Okumura | |
| 2005/0190329 A1 | 9/2005 | Okumura | |
| 2006/0066785 A1 | 3/2006 | Moriya | |
| 2006/0103782 A1 | 5/2006 | Adachi et al. | |
| 2006/0180652 A1 * | 8/2006 | Meek et al. | 235/379 |
| 2008/0012936 A1 * | 1/2008 | White | 348/14.16 |
| 2008/0088587 A1 * | 4/2008 | Pryor | 345/158 |
| 2009/0096954 A1 | 4/2009 | Sakai et al. | |

FOREIGN PATENT DOCUMENTS

| | | |
|---|---|---|
| GB | 2418518 | 3/2006 |
| JP | 62-84020 | 5/1987 |
| JP | 08-114795 | 5/1996 |
| JP | 10-268251 | 10/1998 |
| JP | 11-174489 | 7/1999 |
| JP | 2000-206522 | 7/2000 |
| JP | 2003-100126 A | 4/2003 |
| JP | 2005-004488 | 1/2005 |
| JP | 2005-266847 | 9/2005 |
| JP | 2005-345799 A | 12/2005 |
| KR | 1999-0074569 A | 10/1999 |

OTHER PUBLICATIONS

Official Action mailed Sep. 16, 2010 in U.S. Appl. No. 12/293,911, filed Sep. 22, 2008.

* cited by examiner (a)

A: LUMINANCE OF WHITE DISPLAY PORTION
B: LUMINANCE OF BLACK DISPLAY PORTION
   (SMALL LUMINANCE CAUSED BY LIGHT LEAKAGE)

(b)

A: LUMINANCE OF WHITE DISPLAY PORTION
B: LUMINANCE OF BLACK DISPLAY PORTION
   (SMALL LUMINANCE CAUSED BY LIGHT LEAKAGE)
C: LIGHT FOR REFLECTION

SOLID LINE: CASE IN WHICH 10V VOLTAGE IS APPLIED TO RETARDATION CONTROLLING DEVICE
BROKEN LINE: CASE IN WHICH NO VOLTAGE IS APPLIED TO RETARDATION CONTROLLING DEVICE

DISPLAY SYSTEM

This application is the U.S. national phase of International Application No. PCT/JP2006/325484, filed 21 Dec. 2006, which designated the U.S. and claims priority to Japanese Application No. 2006-152825, filed 31 May 2006, the entire contents of each of which are hereby incorporated by reference.

TECHNICAL FIELD

The technology presented herein relates to a display system which includes a viewing angle control panel for controlling the viewing angle of a display panel.

BACKGROUND AND SUMMARY

Display devices are generally required to have as wide a viewing angle as possible so that a clear image can be seen from any angle. Various technological developments have been carried out in connection with widening of the viewing angle of liquid crystal display devices. This is particularly because liquid crystal display devices, which have been in widespread use in recent years, include liquid crystal having viewing angle dependence.

However, a narrow viewing angle may be preferable, in a specific use environment. This allows a display content to be visible only to the user. Furthermore, laptop personal computers, personal data assistants (PDAs), portable phones and the like are particularly likely to be used in sites, where the general public may be present, such as in trains and airplanes. In such a use environment, the display device has preferably a narrow viewing angle because it is undesirable to let other people nearby see a display content, in light of reason such as confidentiality protection or privacy protection. As described above, there have been increasing demands in recent years for the ability to switch a viewing angle of a single display device between a wide viewing angle and a narrow viewing angle, in conformity with a use condition. Note that the demands are shared by any display devices, not limited to liquid crystal display devices.

In order to address such demands, Patent Document 1, for example, suggests an arrangement in which a retardation controlling device and a display device for displaying an image are provided and a viewing angle characteristic is changed by controlling a voltage applied to the retardation controlling device. According to Patent Document 1, the liquid crystal used in the retardation controlling liquid crystal display device is exemplified by a chiral nematic liquid crystal, a homogeneous liquid crystal, a randomly aligned nematic liquid crystal, and the like.

Further, Patent Documents 2 and 3, for example, disclose arrangements in which a viewing angle controlling liquid crystal panel is provided above a liquid crystal display panel, these panels are sandwiched by two polarizing plates, and a voltage applied to the viewing angle controlling liquid crystal panel is adjusted so that a viewing angle is controlled. According to Patent Document 2, the liquid crystal of the viewing angle controlling liquid crystal panel is a twisted nematic liquid crystal.

[Patent Document 1] Japanese Unexamined Patent Application Publication No. 174489/1999 (Tokukaihei 11-174489; published on Jul. 2, 1999)

[Patent Document 2] Japanese Unexamined Patent Application Publication No. 268251/1998 (Tokukaihei 10-268251; published on Oct. 9, 1998)

[Patent Document 3] Japanese Unexamined Patent Application Publication No. 309020/2005 (Tokukai 2005-309020; published on Nov. 4, 2005)

According to the Patent Document 1, the provision of the retardation controlling liquid crystal device allows switching between a wide viewing angle mode and a narrow viewing angle mode. However, this does not give rise to sufficient effect. For example, Patent Document 1 shows an equal-contrast curve for a contrast ratio of about 10:1, as shown in FIG. 17. This shows that the contrast in a wide viewing angle direction is surely decreased in the narrow viewing angle mode. However, a decrease in contrast to such a degree causes a display to be sufficiently visible to a person next to the user. This is because a display is in general sufficiently visible even if the contrast ratio is decreased, for example, to 2:1.

According to the arts disclosed in Patent Documents 2 and 3, switching between a wide viewing angle and a narrow viewing angle is carried out by changing the voltage applied to the viewing angle controlling liquid crystal panel so that the contrast is adjusted. However, this does not give rise to sufficient effect, either.

Namely, all of the arts disclosed in Patent Documents 1, 2, and 3 adopt a method in which the switching between a wide viewing angle mode and a narrow viewing angle mode is carried out by decreasing the contrast in the wide viewing angle direction. However, according to such a method, blocking off of a view in the narrow viewing angle mode is not sufficient in the wide viewing angle direction, i.e., in a direction in which the narrow viewing angle is not realized. This is likely to cause a problem that a display may be seen by other people.

The present technology addresses the problem discussed above, and aims to provide a display system which is capable of enhancing a blocking effect.

As a result of great devotion to various examinations of the above problem, the inventors have proved that a blocking effect is more enhanced when a display device is used in an environment in which the display device is exposed to external light, and arrived at the present invention.

In order to solve the above problem, a display system of the present technology includes a display device, the display device including: a backlight; a display panel; and a viewing angle control panel for controlling a viewing angle of the display panel, the display system further including a reflected light amount relative increasing section for causing an amount of external light reflected in the display device to be relatively larger than an amount of light leaked from the backlight in the display device. The reason for using the word "relatively" in the above description is that it is also possible to make the amount of reflected light be larger than the amount of light leaked from the backlight, by reducing the luminance of the backlight.

According to the above, the reflected light amount relative increasing section causes the amount of external light reflected in the display device to be relatively larger than the amount of light leaked from the backlight in the display device. This reduces visibility of a display content on the display panel of the display device. As a result, it is possible to provide a display system which is capable of enhancing a blocking effect.

The display device of the present technology may preferably be arranged such that the reflected light amount relative increasing section includes a lighting section for turning on a light for increasing the amount of light reflected in the display device.

Since the lighting section thus turn on a light, it is possible to ensure that the amount of external light reflected in the display device is relatively larger than the amount of light leaked from the backlight.

The display system of the present technology may preferably be such that the lighting section includes the light provided on at least one of four sides surrounding the display device.

This allows a light to be provided on at least one of the four sides surrounding the display device and thereby causes the amount of external light reflected in the display device to be relatively larger than the amount of light leaked from the backlight.

The display system of the present technology may preferably be such that the lighting section includes the light provided so as to face a viewer using the display device.

This allows a light to be provided so as to face a viewer and thereby reduces visibility of a display of the display device, for example, to a person present behind the viewer using the display device, due to an increase in external light reflected in the display device caused by the light.

The display system of the present technology may preferably be such that the display device further includes a touch panel which is provided on a front surface of the display panel and which allows signal input to be entered when part of the touch panel is touched, and the lighting section turns on the light when the tough panel is touched.

This allows a light to be turned on when the touch panel is touched, for example, in a case of operating the display device including the touch panel, which display device is provided in an automatic teller machine (ATM) of a bank. This thereby allows an operator of the display device to prevent a display content from being seen by other people.

The display system of the present technology may preferably be arranged such that the reflected light amount relative increasing section includes a human sensor for sensing presence of a person, and that the lighting section turns on the light when the human sensor senses presence of a person.

This allows a light to be turned on when the sensor senses the presence of a person. This thereby causes the amount of external light reflected in the display device to be relatively larger than the amount of light leaked from the backlight, when an operator using the display device is present. In consequence, when a person is present behind the operator using the display device, the above suppresses visibility of a display to the person present behind the operator.

The display system of the present technology may preferably be arranged such that the display device is provided in a cash dispenser, and that the lighting section turns on the light when a cash card is inserted in the cash dispenser.

The insertion of a cash card into the cash dispenser indicates the presence of an operator using the display device. Turning on a light when a cash card is inserted enhances a blocking effect and prevents a display content to be seen by other people.

The display system of the present technology may preferably be arranged such that the reflected light amount relative increasing section includes a backlight luminance reducing section for reducing luminance of the backlight.

The luminance of the backlight may be reduced as a method of causing the amount of external light reflected in the display device to be relatively larger than the amount of light leaked from the backlight in the display device. This reduces visibility of a display on the display panel of the display device and thereby provides a display system having an enhanced blocking effect.

The display system of the present technology may preferably be arranged such that the display device includes a touch panel which is provided on a front surface of the display panel, and which allows signal input to be entered when part of the touch panel is touched, and the backlight luminance reducing section reduces the luminance of the backlight when the touch panel is touched.

This allows reduction in the luminance of the backlight when the touch panel is touched. Therefore, in a case of operating the display device including the touch panel, which display device is incorporated in an ATM of a bank, touching the touch panel causes the luminance of the backlight to be reduced. This thereby allows an operator of the display device to prevent a display content from being seen by other people.

The display system of the present technology may preferably be arranged such that the reflected light amount relative increasing section includes a human sensor for sensing presence of a person, and that the backlight luminance reducing section reduces the luminance of the backlight when the human sensor senses presence of a person.

This allows reduction in the luminance of the backlight when the sensor senses the presence of a person. This thereby causes the amount of external light reflected in the display device to be relatively larger than the amount of light leaked from the backlight, when an operator using the display device is present. In consequence, when a person is present behind the operator using the display device, the above suppresses visibility of a display to the person present behind the operator.

The display system of the present technology may preferably be arranged such that the display device is provided in a cash dispenser, and that the backlight luminance reducing section reduces the luminance of the backlight when a cash card is inserted in the cash dispenser.

The insertion of a cash card into the cash dispenser indicates the presence of an operator using the display device. Reducing the luminance of the backlight when a cash card is inserted enhances a blocking effect and prevents a display content to be seen by other people.

The display system of the present technology may preferably be arranged such that the human sensor senses the presence of a person with use of infra-red radiation.

This allows the sensor to sense the presence of a person by means of general infra-red radiation and thereby facilitates fabrication of such a sensor.

The display system of the present technology may preferably be arranged such that the human sensor senses presence of a person operating the display device.

This causes the amount of external light reflected in the display device to be relatively larger than the amount of light leaked from the backlight, when an operator using the display device is present.

The display system of the present technology may preferably be arranged such that the human sensor senses presence of a person present behind a person operating the display device.

This causes the amount of external light reflected in the display device to be relatively larger than the amount of light leaked from the backlight, when a person is present behind an operator using the display device.

The display system of the present technology may preferably be arranged such that the reflected light amount relative increasing section includes an ambient illuminance sensor for sensing ambient illuminance of the display device, and that the lighting section turns on the light when illuminance sensed by the ambient illuminance sensor is not more than a set value.

This allows the lighting section to turn on a light when it becomes dark in the ambient environment and therefore the luminance sensed by the ambient illuminance sensor is not more than a set value.

This causes the amount of external light reflected in the display device to be relatively larger than the amount of light leaked from the backlight by turning on the light, when, for example, it becomes dark in the ambient environment early in the evening and therefore visibility of the display device becomes better.

The display system of the present technology may preferably be arranged such that the reflected light amount relative increasing section further includes an ambient illuminance sensor for sensing ambient illuminance of the display device, and the backlight luminance reducing section reduces the luminance of the backlight when illuminance sensed by the ambient illuminance sensor is not more than a set value.

This allows the backlight luminance reducing section to reduce the luminance of the backlight when the luminance sensed by the ambient illuminance sensor is not more than a set value.

This causes the amount of external light reflected in the display device to be relatively larger than the amount of light leaked from the backlight, when, for example, it becomes dark in the ambient environment early in the evening and therefore visibility of the display device becomes better.

The display system of the present technology may preferably be arranged such that the reflected light amount relative increasing section includes a polarizing plate, provided on a front surface of the display device, which has been subjected to a diffusion treatment.

This allows a polarizing plate having been subjected to a diffusion treatment to be provided on the front surface of the display device, and thereby enhances a blocking effect of the viewing angle control panel, as compared to the case in which a polarizing plate not having been subjected to a diffusion treatment is included.

The display system of the present technology may preferably be arranged such that the reflected light amount relative increasing section further includes, in at least a part of an area surrounding the display device, a reflective member for increasing the amount of light reflected in the display device.

This allows a reflective member to be provided in at least a part of the area surrounding the display device, and thereby increases the amount of light reflected in the display device.

This enhances the effect of causing the amount of external light reflected in the display device to be relatively larger than the amount of light leaked from the backlight, which effect is due to the lighting or reduction in the luminance of the backlight.

The display system of the present technology may preferably be arranged such that the reflective member is provided so as to face a viewer using the display device.

This causes external light to be reflected by the reflective member provided so as to face the viewer using the display device, and thereby suppresses visibility of a display of the display device, for example, to a person present behind the viewer using the display device, due to reflected light caused by the reflective member.

The display system of the present technology may preferably be arranged such that the reflective member is a reflective plate which faces, at a variable angle, the display device.

Consequently, changing the angle of the reflective plate which faces, at a variable angle, the display device prevents a display of the display device from being visible from a specific angle.

The display system of the present technology may preferably be arranged such that the viewing angle control panel includes: a liquid crystal cell including: a pair of transparent substrates; and a liquid crystal layer provided between the transparent substrates, the liquid crystal layer having liquid crystal molecules aligned vertically, and a driving circuit for applying a voltage to the liquid crystal layer, that the liquid crystal cell being provided between two polarizing plates which are provided to face each other so that polarizing transmission axes thereof are substantially at right angle, and that the driving circuit changes an alignment of the liquid crystal molecules included in the liquid crystal layer of the liquid crystal cell so that a display state is switched between a first viewing angle range and a second viewing angle range which is within the first viewing angle range and is narrower than the first viewing angle range.

According to the above, the two polarizing plates having polarizing transmission axes which are substantially at right angle are provided so as to sandwich the liquid crystal cell of the viewing angle control panel. The viewing angle control panel and the two polarizing plates are not necessarily adjacent to each other. There may be another element therebetween.

According to the above arrangement, application of a predetermined voltage to the liquid crystal layer causes the alignment of the liquid crystal molecules to change. Use of birefringence of the liquid crystal allows a change in the polarization of light to be emitted from the liquid crystal cell of the viewing angle control panel. The polarizing plate provided on the side of the viewing angle control panel which side faces a viewer serves as an analyzer. Consequently, the light to be emitted from the viewing angle control panel toward the viewer is either transmitted or blocked depending on the angle. In other words, the display state is capable of being switched between (i) a wide viewing angle which forms the first viewing angle range and (ii) a narrow viewing angle which forms the second viewing angle range, which is within the first viewing angle range and narrower than the first viewing angle range. It should be noted that the terms "wide viewing angle" and "narrow viewing angle" do not refer to any specific, absolute angle ranges. They refer to a relatively wide viewing angle and a relatively narrow viewing angle.

According to the above arrangement, the use of the liquid crystal cell having liquid crystal molecules aligned vertically allows a narrow viewing angle mode to be achieved in which mode a display is only visible from within a limited viewing angle. This allows a viewing angle control by switching between transmission and blocking of light, unlike the conventional art of controlling a viewing angle in which art the contrast of a display is decreased in the wide viewing angle direction. This causes the amount of external light reflected in the display device to be larger than the amount of light leaked from the backlight, even in the narrow viewing angle mode, and thereby enhances a blocking effect.

The display system of the present technology may preferably be arranged such that the display panel is a liquid crystal display panel. The liquid crystal display panel may be a transmissive liquid crystal display panel, a reflective liquid crystal display panel, or a semi-transmissive liquid crystal display panel.

This provides a display system including a liquid crystal display panel and having an enhanced blocking effect.

For a fuller understanding of the nature and advantages of the example embodiments presented herein, reference should be made to the ensuing detailed description taken in conjunction with the accompanying drawings.

Figure 3:
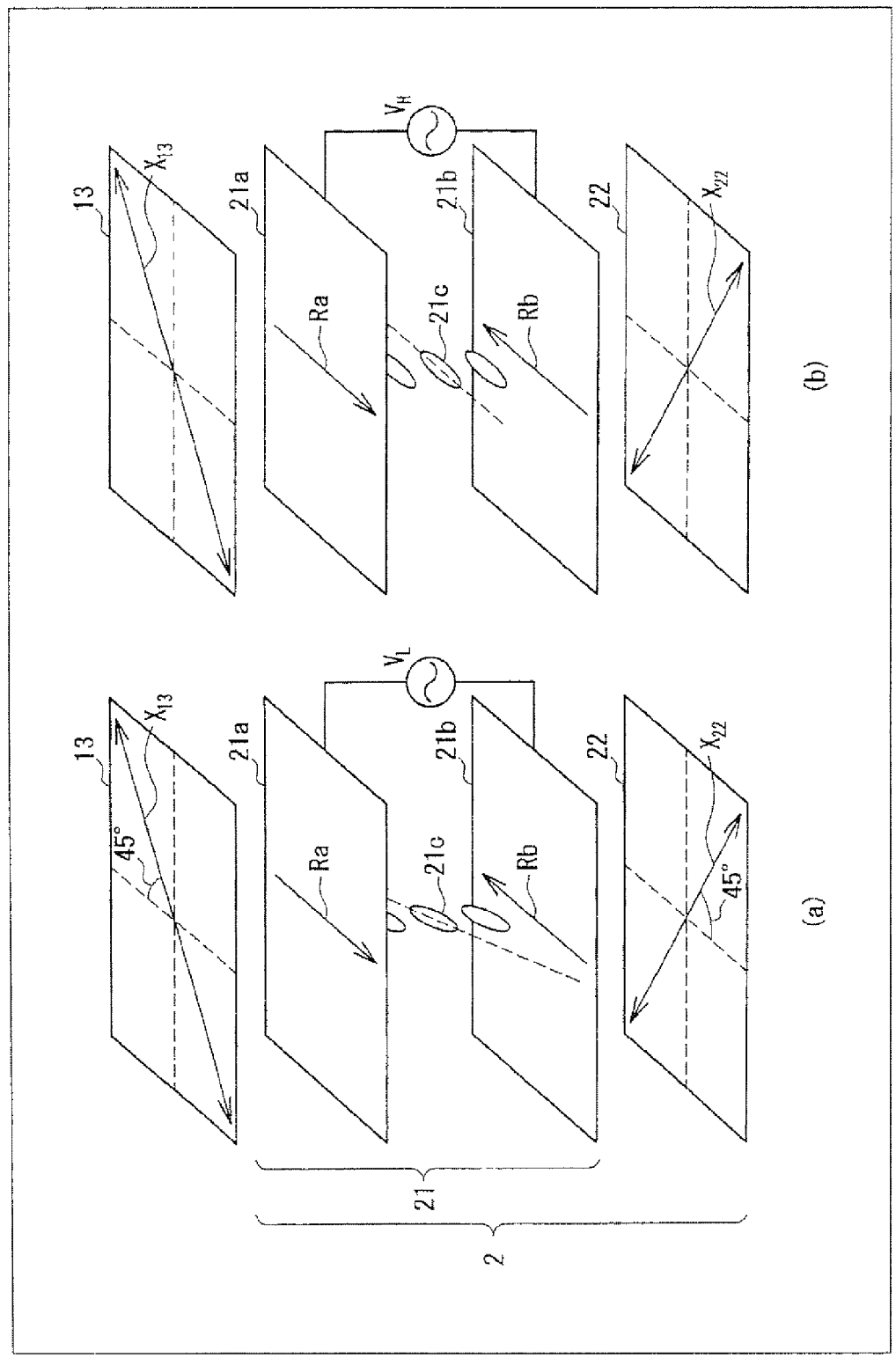

(a) of FIG. 3 is a perspective view of the alignment of liquid crystal molecules of the viewing angle control panel in a narrow viewing angle mode, and (b) of FIG. 3 is a perspective view of the alignment of the liquid crystal molecules of the viewing angle control panel in a wide viewing angle mode.

Figure 4:
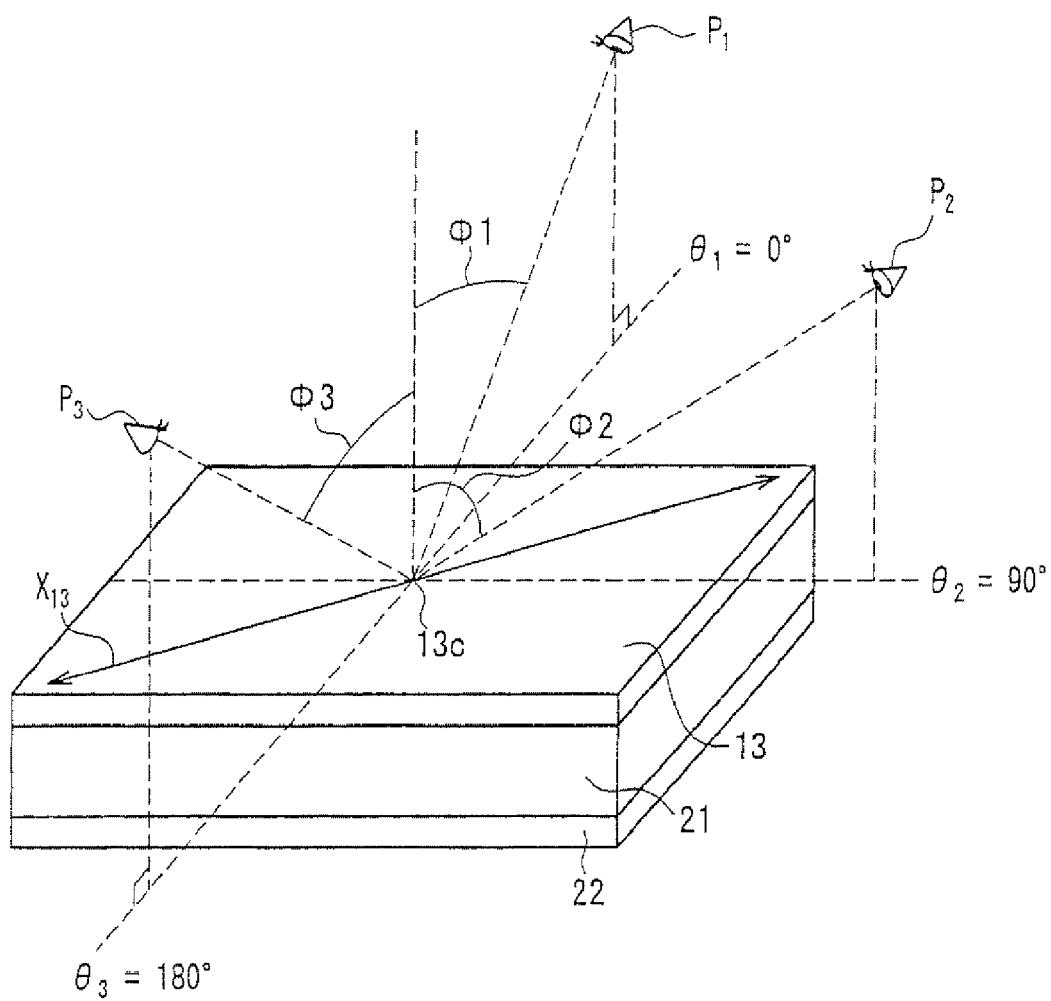

FIG. 4 is a schematic view defining angles with respect to a laminate of the viewing angle control panel and a second polarizing plate which are disposed in the same orientation as in (a) and (b) of FIG. 3.

Figure 5:
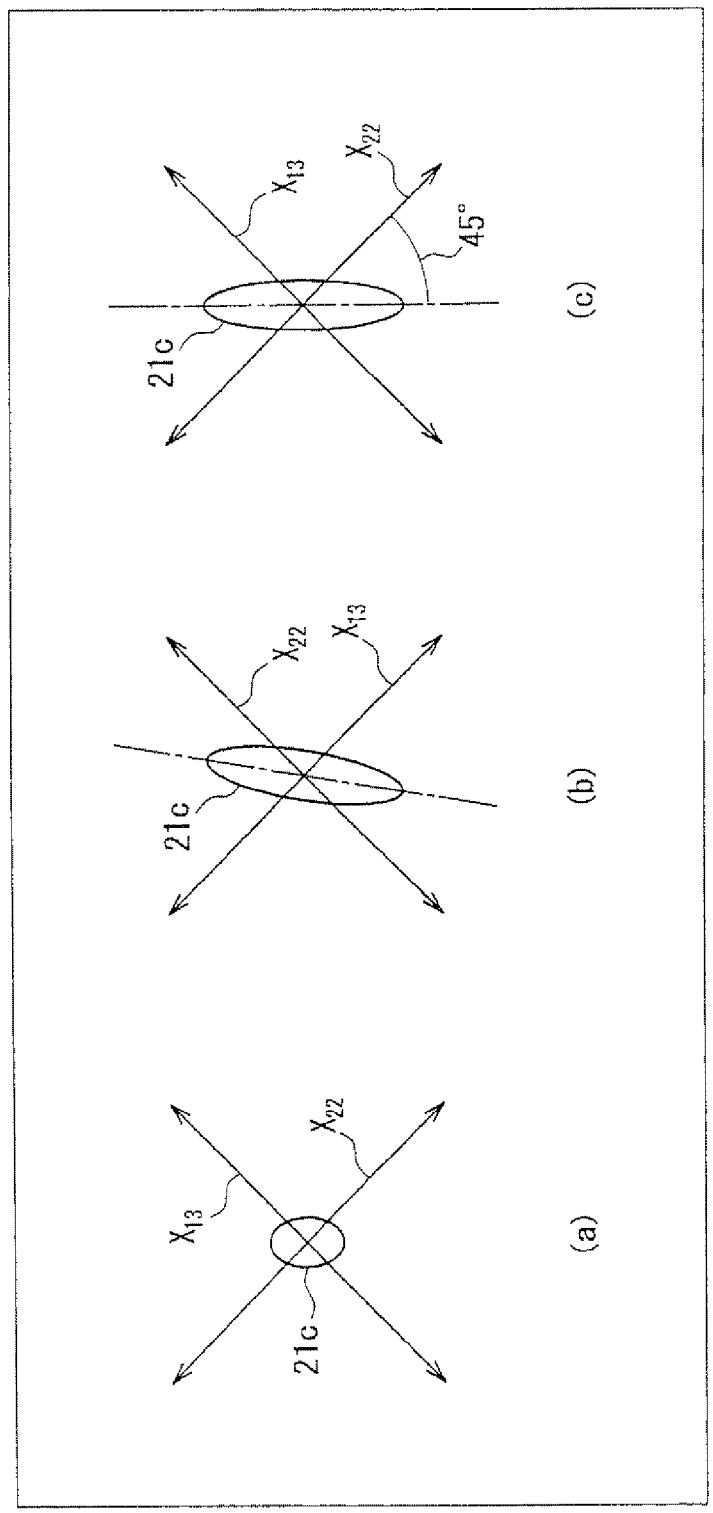

(a), (b), and (c) of FIG. 5 are views illustrating the positional relationship between a liquid crystal molecule and polarizing transmission axes at respective angles.

Figure 6:
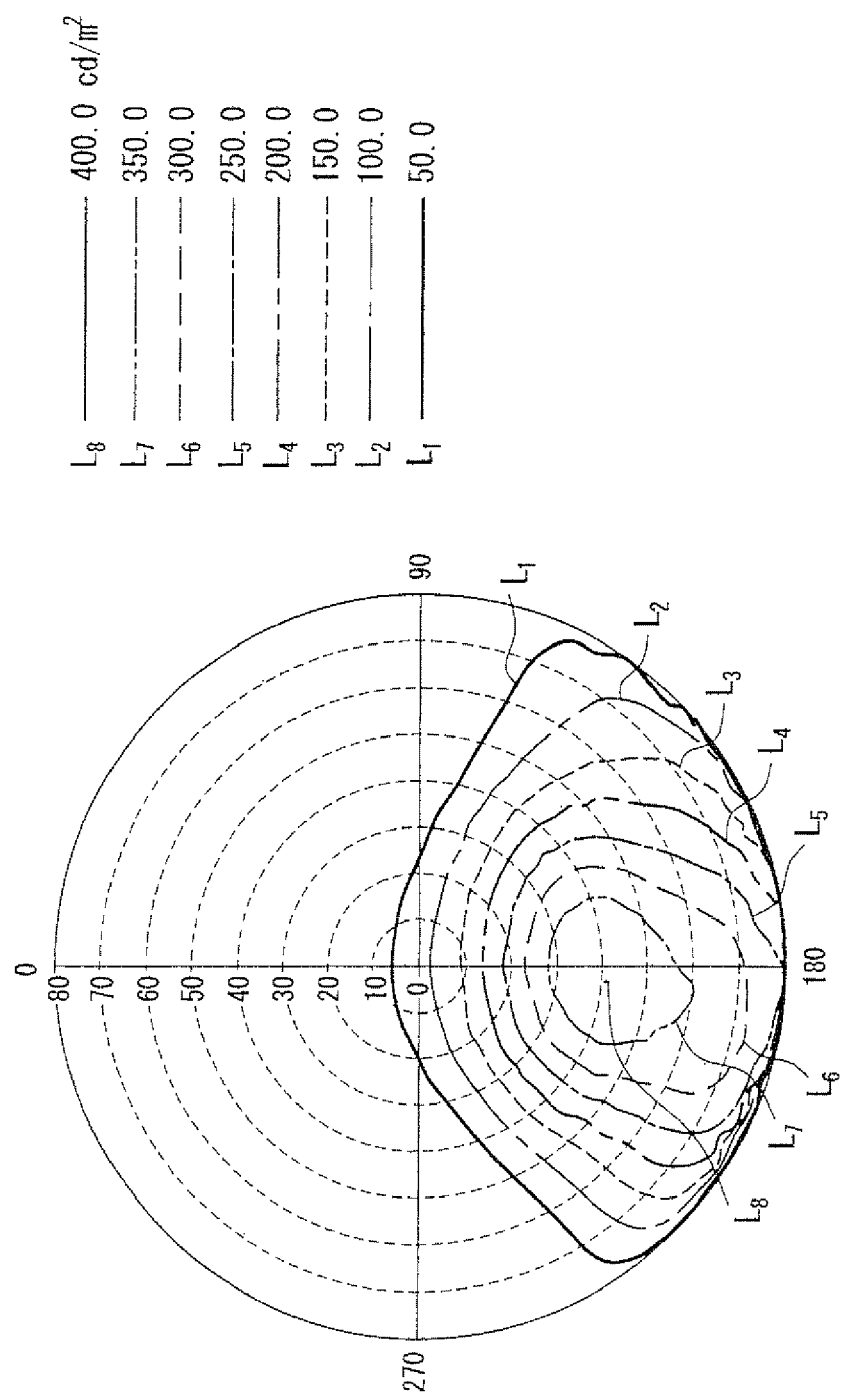

FIG. 6 is a chart illustrating a luminance distribution in the narrow viewing angle mode of the liquid crystal display.

Figure 7:
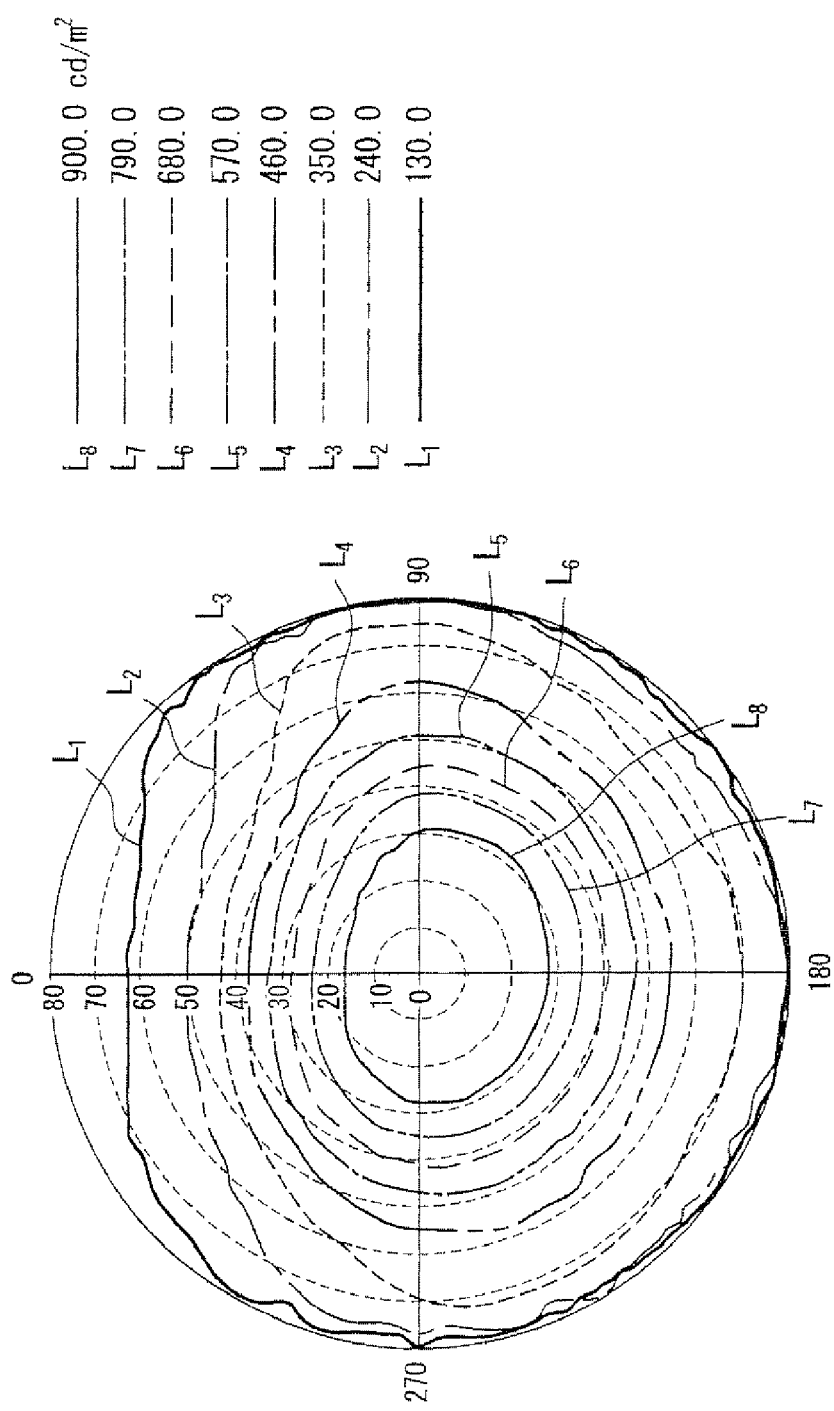

FIG. 7 is a chart illustrating a luminance distribution in the wide viewing angle mode of the liquid crystal display.

Figure 8:
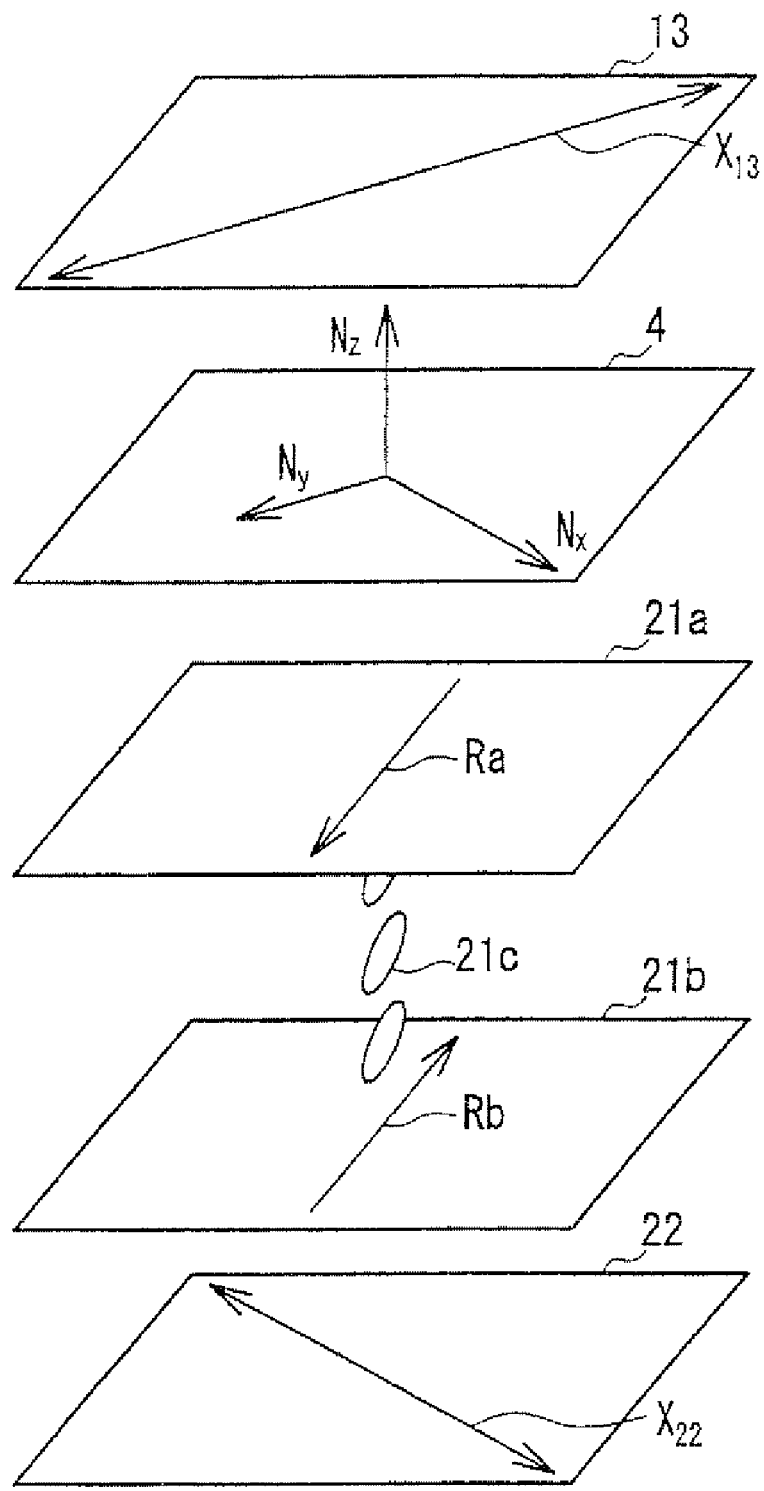

FIG. 8 is a schematic view of a viewing angle control panel included in the liquid crystal display, including a retardation film between a transparent substrate and a polarizing plate.

Figure 9:
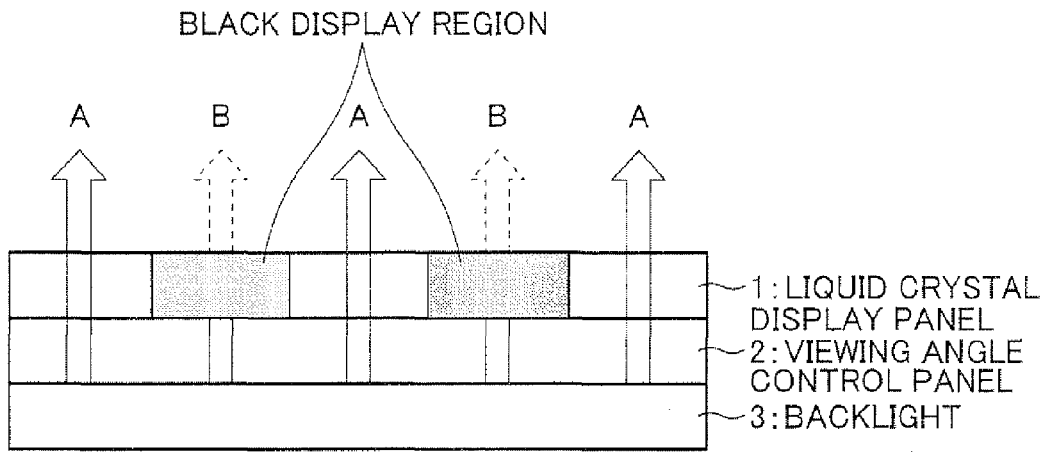
Figure 9:
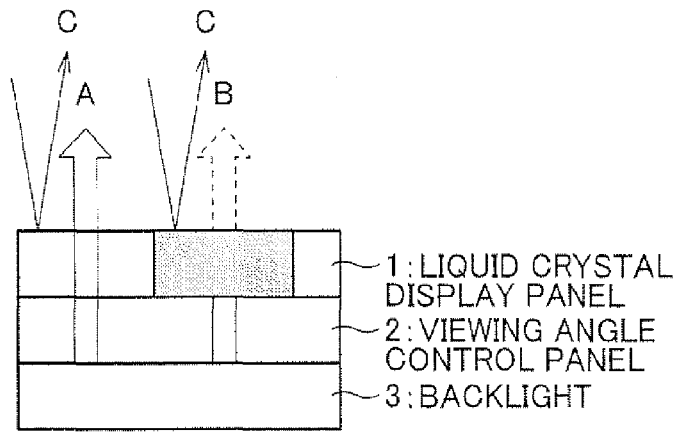

(a) of FIG. 9 is a schematic view of a mechanism of image visibility in the absence of reflected light, and (b) of FIG. 9 is a schematic view of a mechanism of image visibility in the presence of reflected light.

Figure 10:
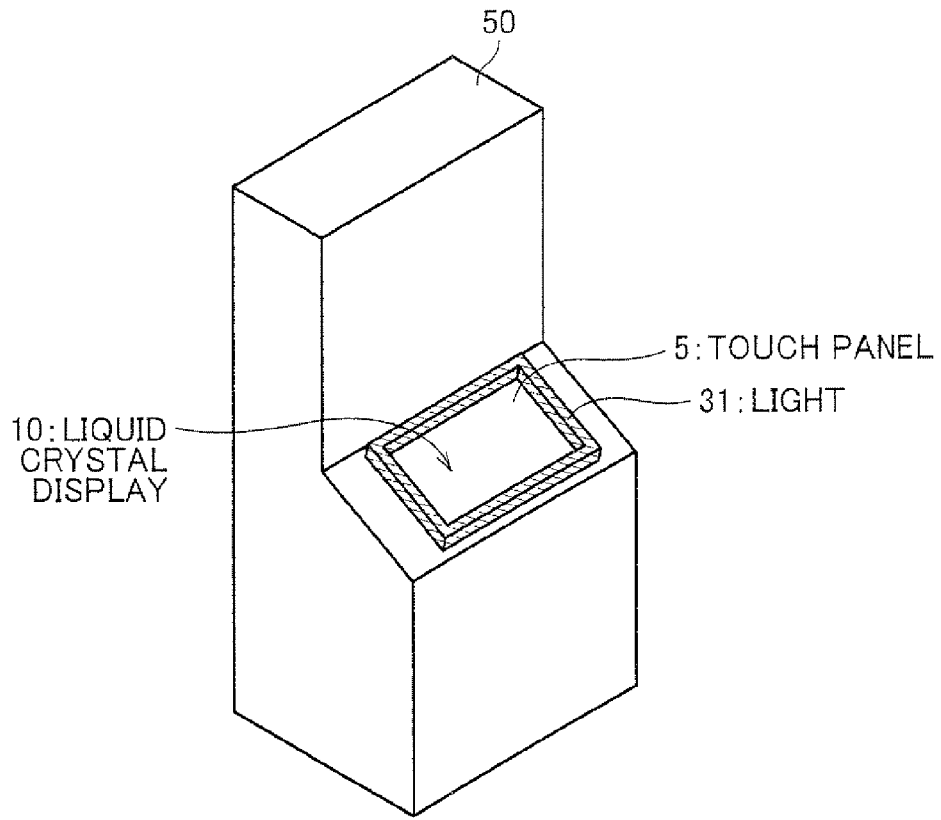
Figure 10:
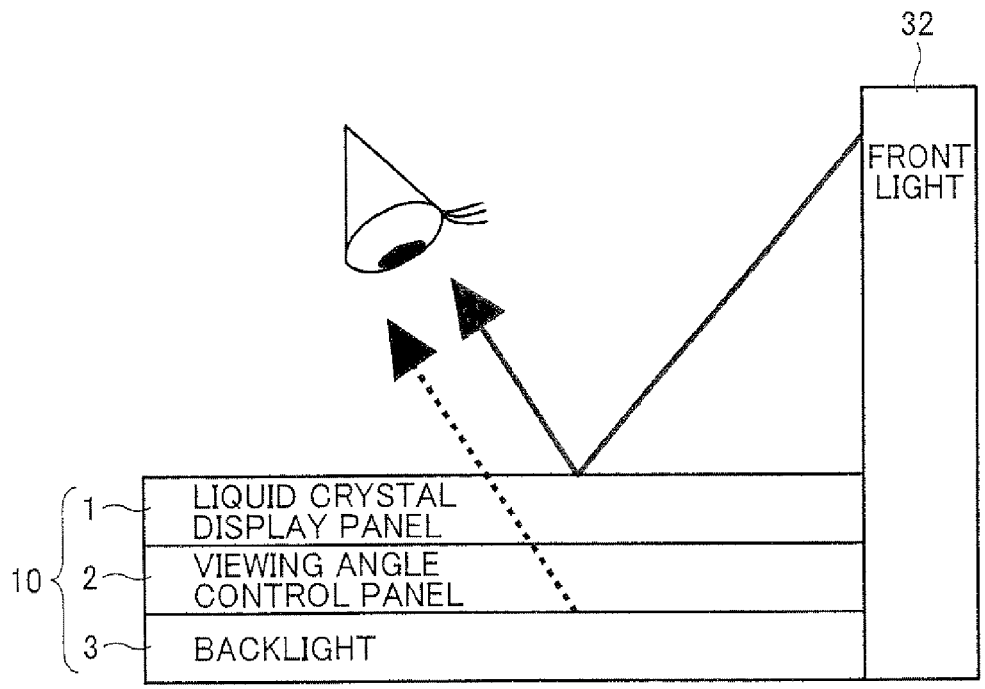

FIG. 10 (a) is a perspective view of a display system including a light disposed in the area surrounding the liquid crystal display.

FIG. 10 (b) is a side view of a display system including a front light disposed so as to face the viewer using the liquid crystal display.

Figure 11:
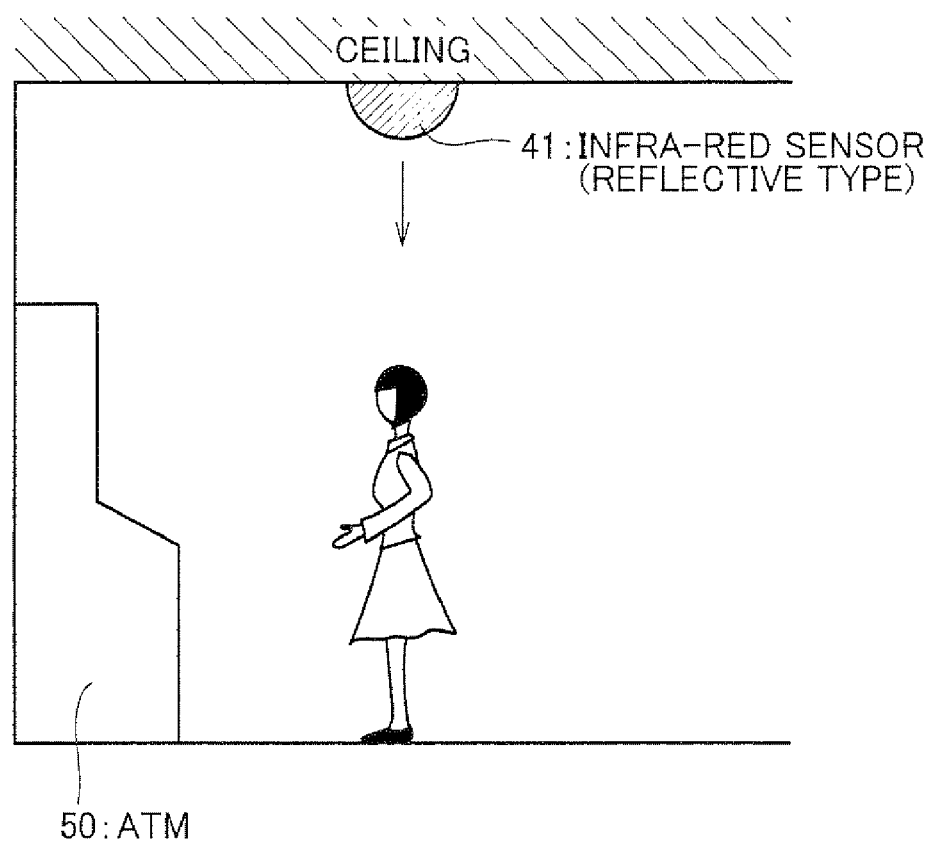

FIG. 11 is a side view of a display system which includes, on the ceiling of a room where an ATM is installed, an infra-red sensor which senses the presence of a person.

Figure 12:
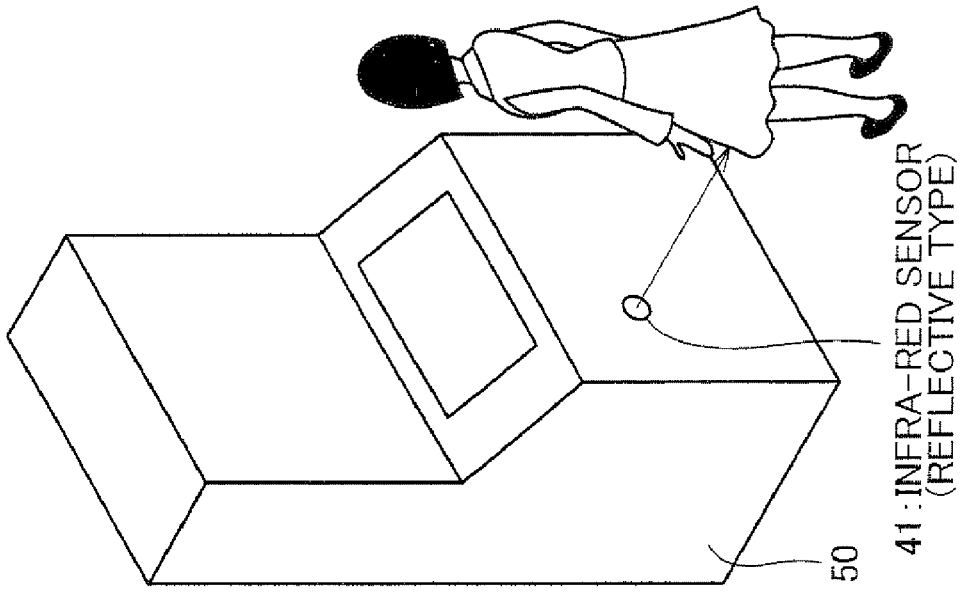
Figure 12:
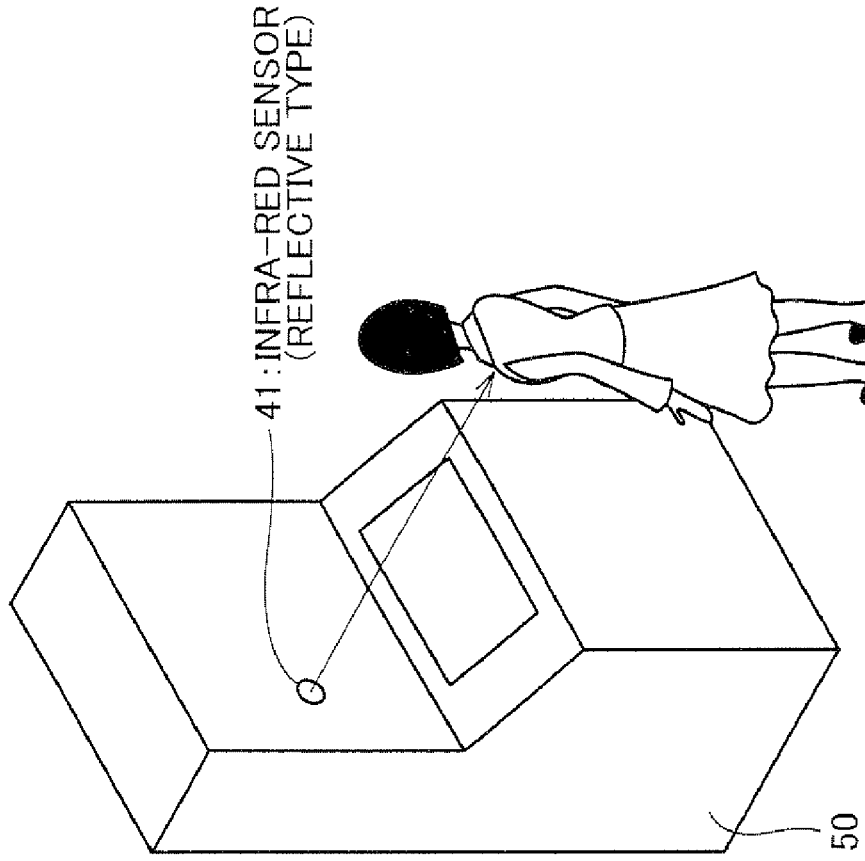

FIG. 12 (a) is a perspective view of a display system including the infra-red sensor, disposed in an ATM, which senses the presence of a person.

FIG. 12 (b) is a perspective view of another display system including the infra-red sensor, disposed in an ATM, which senses the presence of a person.

Figure 13:
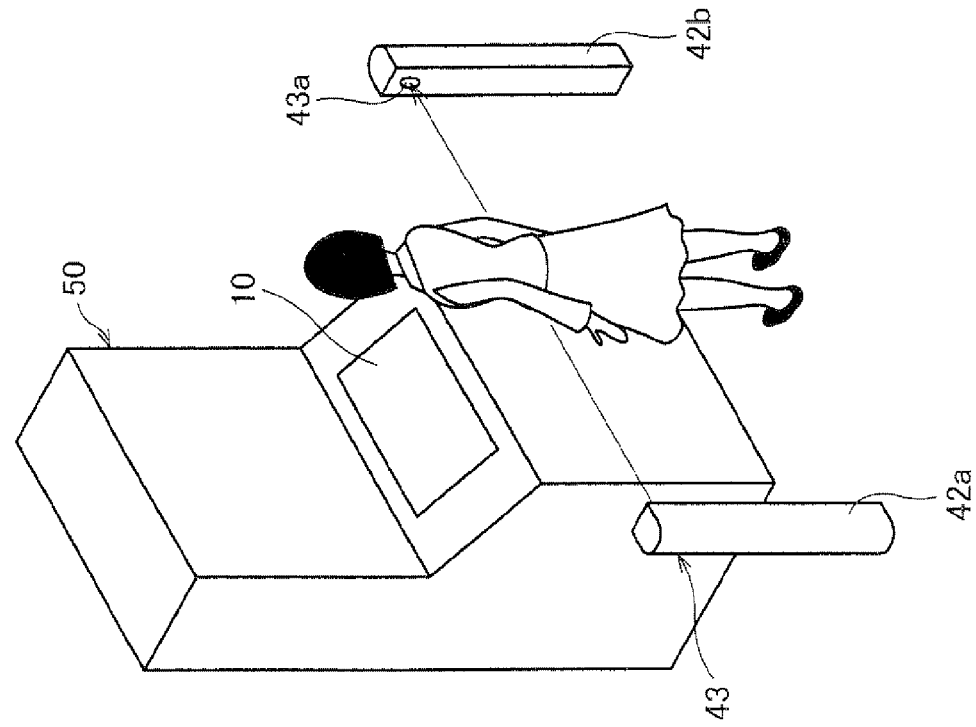
Figure 13:
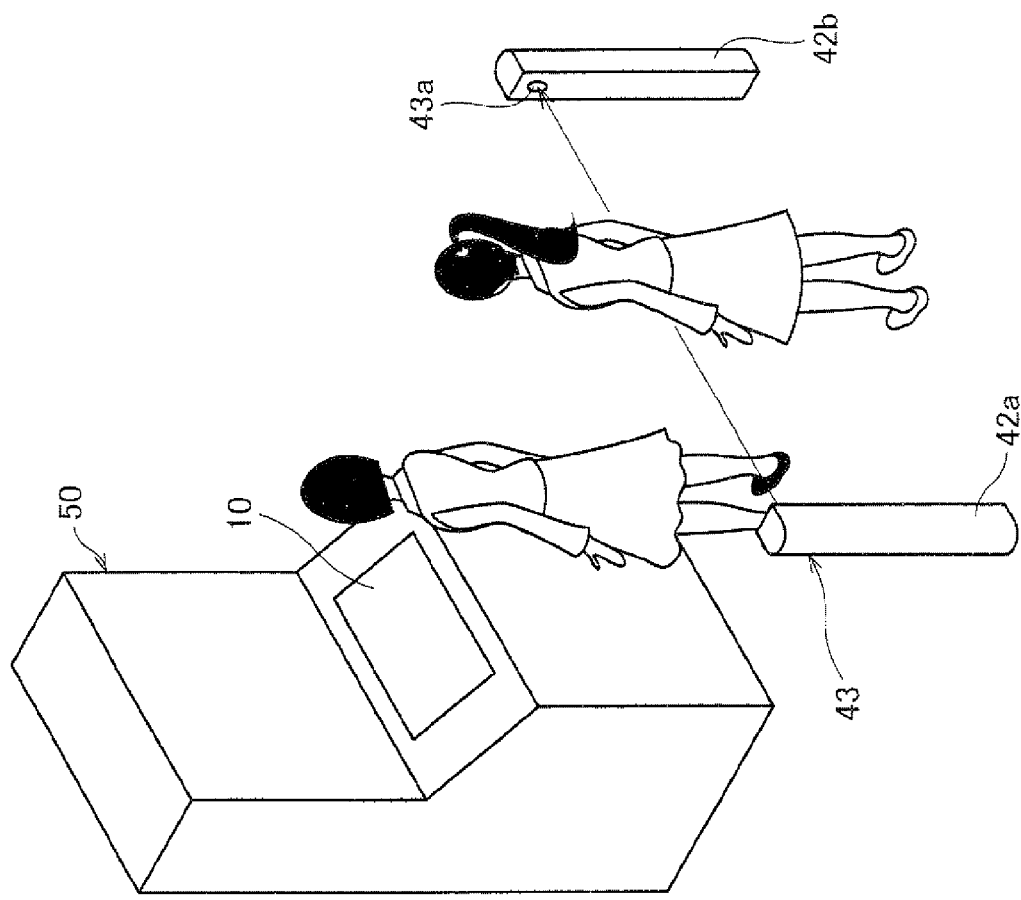

FIG. 13 (a) is a perspective view of a display system including an infra-red sensor, disposed immediately in front of an ATM, which senses the presence of a person using the liquid crystal display.

FIG. 13 (b) is a perspective view of a display system including the infra-red sensor which senses the presence of a person waiting in front of an ATM.

Figure 14:
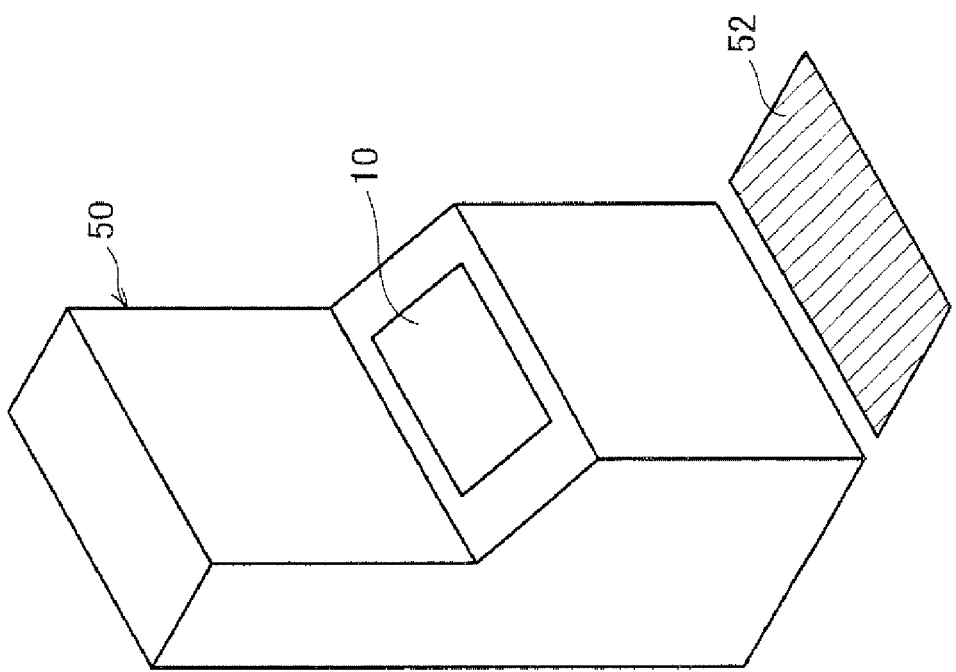
Figure 14:
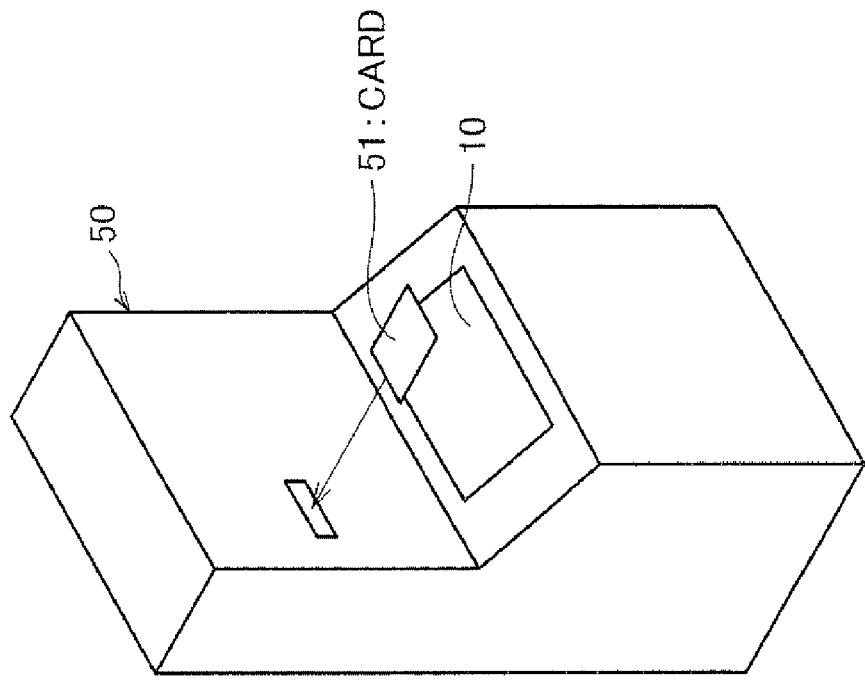

FIG. 14 (a) is a perspective view of a display system which turns on a light when a card is inserted in the ATM.

FIG. 14 (b) is a perspective view of a display system including a footboard for sensing the presence of a person, disposed in front of an ATM.

Figure 15:
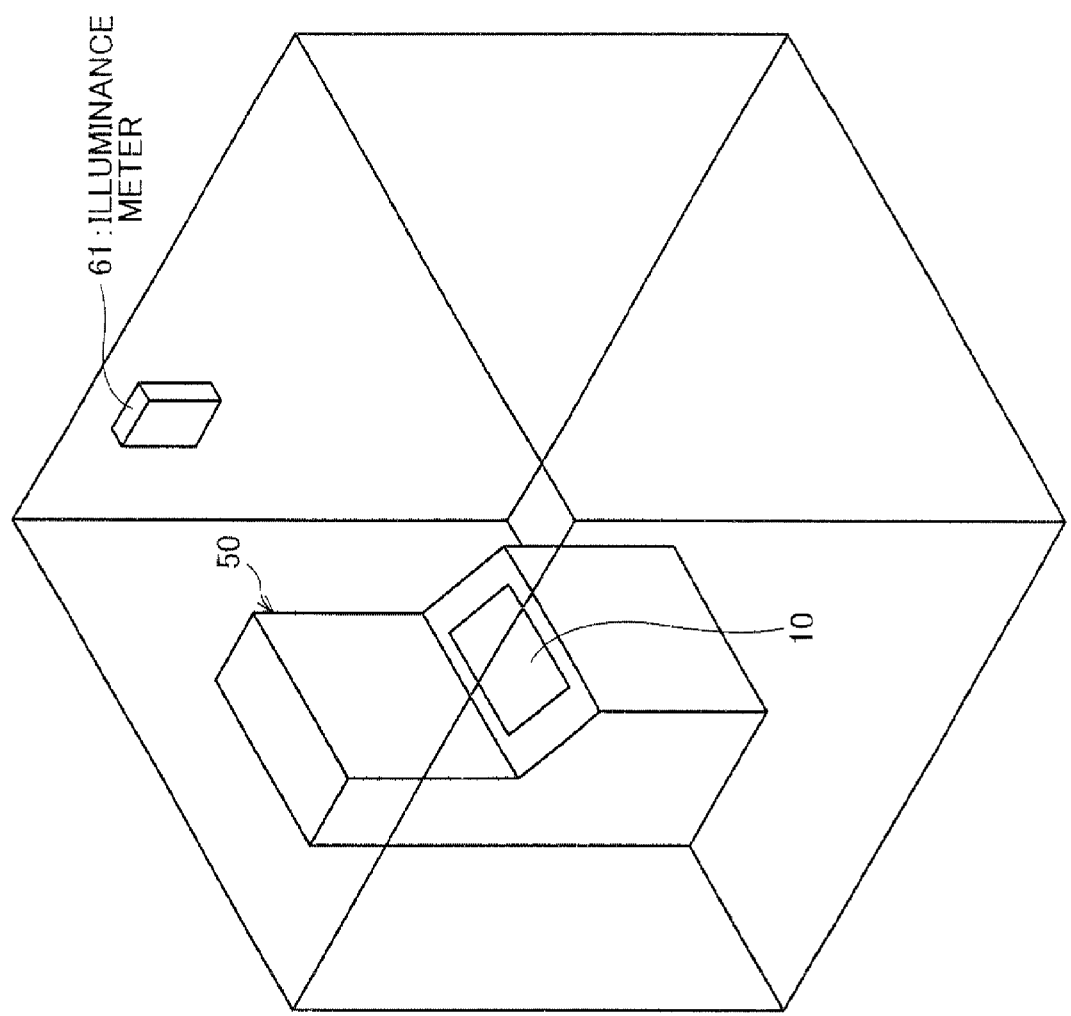
Figure 15:
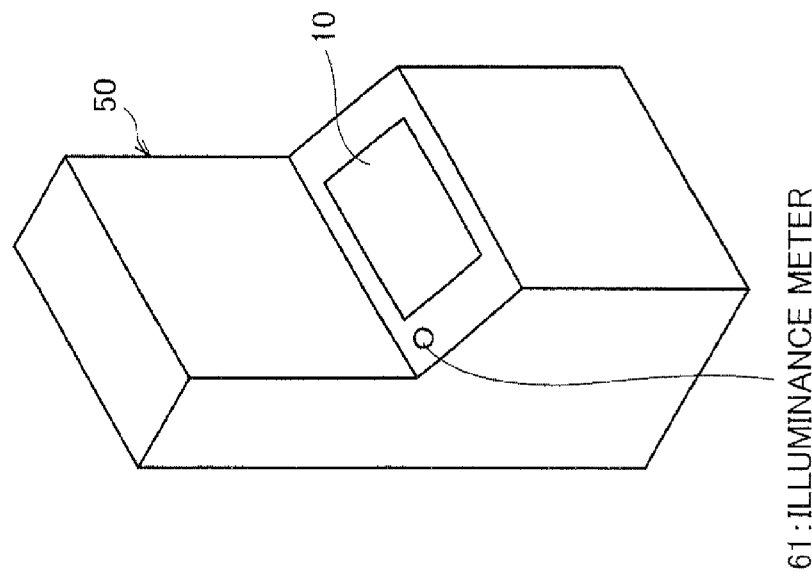

FIG. 15 (a) is a perspective view of a display system which includes an illuminance meter disposed in an ATM.

FIG. 15 (b) is a perspective view of a display system which includes the illuminance meter disposed in a room where an ATM is installed.

Figure 16:
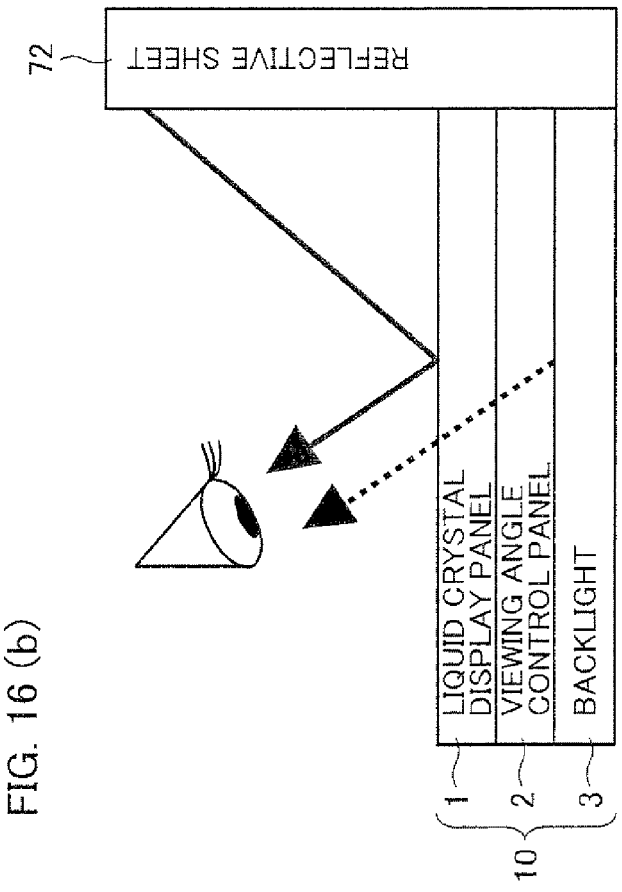
Figure 16:
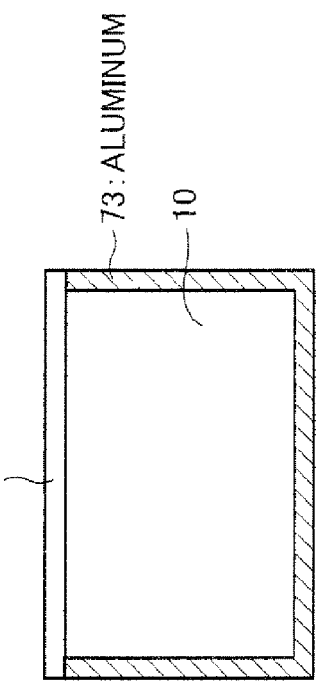
Figure 16:
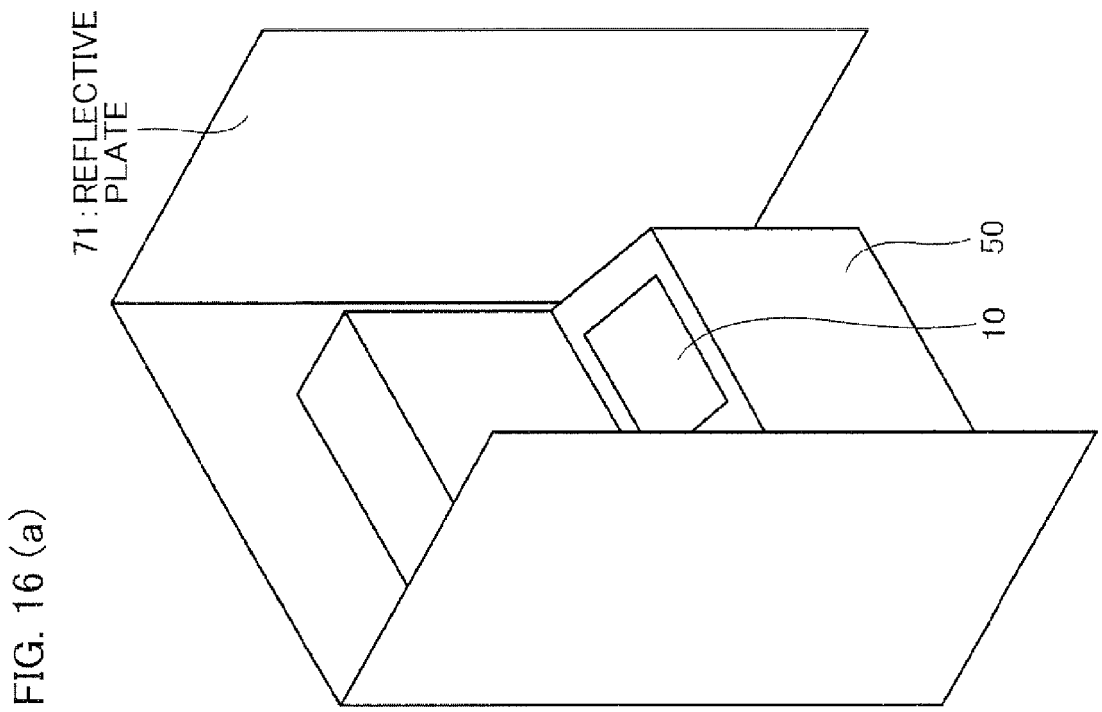

FIG. 16 (a) is a perspective view of a display system which includes a reflective plate disposed surrounding an ATM.

FIG. 16 (b) is a side view of a display system which includes a reflective sheet disposed so as to face a viewer using the liquid crystal display.

FIG. 16 (e) is a plan view of a display system which includes the front light and an aluminum member surrounding the liquid crystal display.

Figure 17:
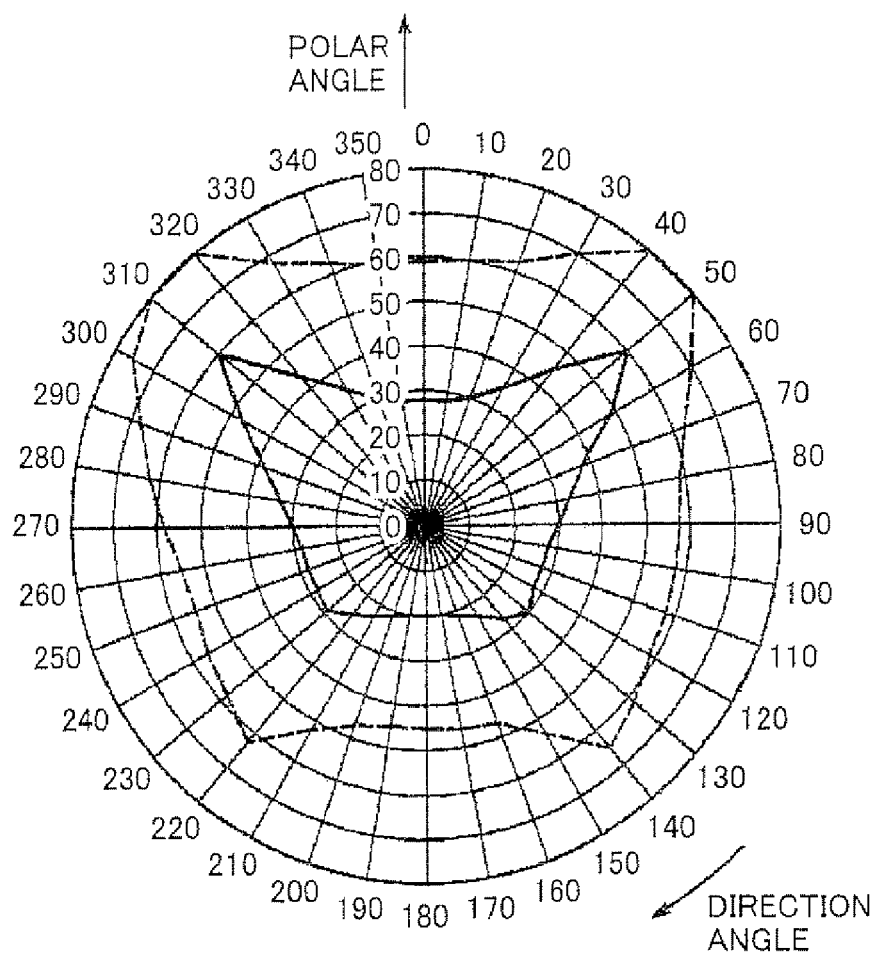

FIG. 17 is a chart illustrating a luminance distribution of a liquid crystal display which includes a conventional viewing angle control panel.

DESCRIPTION OF THE NUMBERED CODES 1 liquid crystal display panel (display panel)
2 viewing angle control panel
3 backlight
5 touch panel
10 liquid crystal display (display device)
11 liquid crystal cell
12 first polarizing plate (polarizing plate on the front side)
13 second polarizing plate (the two polarizing plates)
21 liquid crystal cell
21a transparent substrate
21b transparent substrate
21c liquid crystal molecule
22 third polarizing plate (the two polarizing plates)
31 light (light; reflected light amount relative increasing section)
32 front light (light; reflected light amount relative increasing section)
41 infra-red sensor (sensor)
43 infra-red sensor (sensor)
50 ATM
51 cash card
52 panel for sensing a person (sensor)
61 illuminance meter (ambient illuminance sensor)
71 reflective plate (reflective member)
72 reflective sheet (reflective member)
73 aluminum member (reflective member)
$X_{13}$ polarizing transmission axis
$X_{22}$ polarizing transmission axis

DETAILED DESCRIPTION

One embodiment is described below with reference to FIGS. 1 through 16. For convenience of explanation, the drawings which are referred to in the following description only show, in a simplified manner, main members which are needed for explanation of the present embodiment. As such, a display system of the present embodiment may include any constituent member which is not shown in the drawings that are referred to in the present specification. In addition, the sizes of members in the figures do not accurately show the sizes of the actual constituent members, the size proportion of such members, or the like.

Figure 2:
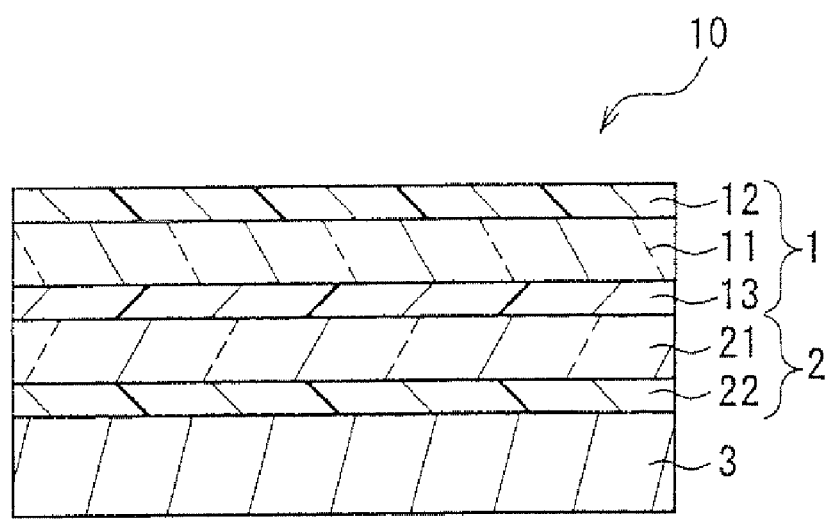
FIG. 2 is a sectional view of a liquid crystal display including a viewing angle control panel, used in the display system.

The following description deals with an arrangement of a liquid crystal display 10 included in the display system of the present embodiment. FIG. 2 is a sectional view schematically illustrating an arrangement of the liquid crystal display 10.

As illustrated in FIG. 2, the liquid crystal display 10 includes two liquid crystal panels: a liquid crystal display panel 1 serving as a display panel for displaying an image; and a viewing angle control panel 2 which includes a liquid crystal cell 21. The liquid crystal display panel 1 is of a transmissive type. A backlight 3 is used as a light source.

As shown in FIG. 2, the viewing angle control panel 2 is provided, for example, between the backlight 3 and the liquid crystal display panel 1.

The liquid crystal display 10 is arranged such that switching of the liquid crystal in the viewing angle control panel 2 allows switching between two display modes, i.e., (i) a wide viewing angle mode in which the viewing angle, at which a display of the liquid crystal display panel 1 is visible, is wide, and (ii) a narrow viewing angle mode in which the viewing angle, at which a display of the liquid crystal display panel 1 is visible, is narrow. The narrow viewing angle mode is particularly suitable for a case where it is undesirable to let other people see a display on the liquid crystal display panel 1. The wide viewing angle mode is particularly suitable for a case, other than the case, such as normal use case or a case where two or more people simultaneously look at a display on the liquid crystal display panel 1.

The liquid crystal display panel 1 includes: a liquid crystal cell 11 that includes a pair of transparent substrates and liquid crystal sandwiched therebetween; a first polarizing plate 12 disposed on the top surface of the liquid crystal cell 11; and a second polarizing plate 13 disposed on the bottom surface of the liquid crystal cell 11. Any liquid crystal and any cell structure can be used as the liquid crystal cell 11. In addition, any driving method can be applied to the liquid crystal display panel 1. In other words, any liquid crystal panel which is capable of displaying characters, still images, or moving images can be used as the liquid crystal display panel 1. As such, FIG. 2 does not show a specific structure of the liquid crystal display panel 1, and a description of the liquid crystal display panel 1 is omitted.

The liquid crystal display panel 1 may be capable of carrying out a color display, or exclusively carry out a monochrome display. In addition, the arrangement of the backlight 3 is not limited to a specific one, and any publicly known backlight may be used. Thus, the structure of the backlight 3 is not shown in a figure or described herein.

The viewing angle control panel 2 includes: a liquid crystal cell 21 that includes: a liquid crystal cell 21; and a third polarizing plate 22. The liquid crystal cell 21 includes a pair of light-transmitting substrates 21a and 21b (described below) and a liquid crystal layer which is sandwiched by the light-transmitting substrates 21a and 21b. The third polarizing plate 22 is provided on a side of the liquid crystal cell 21 which side faces the backlight 3. The liquid crystal layer is realized by a vertically aligned (homeotropically aligned) nematic liquid crystal. According to the present embodiment, the viewing angle control panel 2 includes the liquid crystal cell 21 and is capable of being switched between the wide viewing angle mode and the narrow viewing angle mode. However, the present invention is not limited to this. The viewing angle control panel 2 is not required to include the liquid crystal cell 21, or to be capable of being switched between the wide viewing angle mode and the narrow viewing angle mode.

The following explains in detail the structure and operation of the viewing angle control panel 2, with reference to (a) and (b) of FIG. 3. (a) and (b) of FIG. 3 are schematic views primarily illustrating the structure of the viewing angle control panel 2. (a) of FIG. 3 shows how liquid crystal molecules align in the narrow viewing angle mode. (b) of FIG. 3 shows how the liquid crystal molecules align in the wide viewing angle mode.

As shown in (a) and (b) of FIG. 3, the liquid crystal cell 21 of the viewing angle control panel 2 includes a pair of light-transmitting substrates 21a and 21b. Each surface of the light-transmitting substrates 21a and 21b has a transparent electrode (not shown) made, for example, of indium tin oxide (ITO). On the one hand, the liquid crystal display panel 1 includes an electrode structure which corresponds to a unit of display because it is required to drive the liquid crystal for such a unit of display, e.g., for each pixel or for each segment. On the other hand, the electrode structure of the viewing angle control panel 2 is not limited to a specific one. For example, a transparent electrode may be provided uniformly on each entire surface of the light-transmitting substrates 21a and 21b so that switching is carried out uniformly over the entire display surface. Instead, any other electrode structure may be adopted.

An alignment film (not shown) for causing liquid crystal molecules 21c to align is provided on each of the transparent electrodes. The alignment film has been subjected to a rubbing treatment based on a publicly known method. The rubbing directions for the alignment films of the light-transmitting substrates 21a and 21b are indicated by arrows Ra and Rb, respectively, in (a) and (b) of FIG. 3. As shown in (a) and (b) of FIG. 3, the rubbing direction Ra for the alignment film of the light-transmitting substrate 21a is parallel and reverse to the rubbing direction Rb for the alignment film of the light-transmitting substrate 21b.

In other words, the liquid crystal cell 21 is of a so-called parallel type in which the twist angle is 0 degree (no twist is provided). According to the present embodiment, the liquid crystal which is injected into the liquid crystal cell 21 is a negative nematic liquid crystal having a negative dielectric anisotropy. As such, when no voltage is applied to the liquid crystal, the liquid crystal molecules 21c of the liquid crystal cell 21 are aligned so that the molecular long axes lie vertically to the surfaces of the light-transmitting substrates 21a and 21b. The liquid crystal layer of the liquid crystal cell 21 has a retardation d·Δn in a range from 200 nm to 350 nm, for example.

When a voltage is applied across the electrodes (not shown) provided on the light-transmitting substrates 21a and 21b, the liquid crystal molecules 21c, which lie vertically to the surfaces of the substrates, gradually change their alignment directions, in accordance with the intensity of the voltage applied, in a plane parallel to normals of the light-transmitting substrates 21a and 21b and parallel to the rubbing directions Ra and Rb with respect to the alignment film of the light-transmitting substrate 21a (see (a) of FIG. 3). When the voltage applied reaches a predetermined voltage, the liquid crystal molecules 21c are aligned so that the molecular long axes are parallel to the surfaces of the light-transmitting substrates 21a and 215 (see (b) of FIG. 3). (a) of FIG. 3 shows a state in which a voltage $V_L$ (e.g., a voltage of 2.5 V to 3.5 V) has caused the molecular long axes of the liquid crystal molecules 21c to be slanted with respect to the normals of the light-transmitting substrates 21a and 21b. (b) of FIG. 3 shows a state in which a voltage $V_H$ (e.g., a voltage of 5.0 V or greater) has caused the molecular long axes of the liquid crystal molecules 21c to lie substantially parallel to the surfaces of the light-transmitting substrates 21a and 21b.

As illustrated in (a) of FIG. 3, in the viewing angle control panel 2, the third polarizing plate 22 and the second polarizing plate 13 of the liquid crystal display panel 1 are provided so that the respective polarizing transmission axes $X_{22}$ and $X_{13}$ cross each other substantially at right angle. The third polarizing plate 22 and the second polarizing plate 13 correspond to the two polarizing plates disposed to face each other so as to sandwich the liquid crystal cell 21 in accordance with the present invention. Further, the first polarizing plate 12 corresponds to a polarizing plate of the present invention.

When an angle formed by the polarizing transmission axes $X_{22}$ and $X_{13}$ falls in the range from 80° to 100°, a sufficient effect obtained by switching a viewing angle is ensured. The polarizing transmission axis $X_{13}$ of the second polarizing plate 13 of the liquid crystal display panel 1 is at an angle in the range from 40° C. to 50° C. (preferably an angle of 45° C.) with respect to the rubbing direction R for the alignment film of the light-transmitting substrate 211a.

With reference to (a) and (b) of FIGS. 3, 4, and FIG. 5, the following description deals with how the viewing angle is switched between the wide viewing angle and the narrow viewing angle with use of the viewing angle control panel 2 having the above arrangement. In the viewing angle control panel 2, the viewing angle is switched between the wide viewing angle mode and the narrow viewing angle mode, by switching a voltage applied to the liquid crystal cell 21, in conjunction with the second polarizing plate 13 of the liquid crystal display panel 1. In the following description, the viewing angle from a point of view with respect to the laminate of the viewing angle control panel 2 and the second polarizing plate 13 is indicated by a direction angle $\theta$ and a polar angle $\Phi$ on the basis of the center of the second polarizing plate 13. FIG. 4 shows the viewing angles from three points of view $P_1$ through $P_3$ with respect to the laminate of the viewing angle control panel 2 and the second polarizing plate 13 which is provided in the same direction as those in (a) and (b) of FIG. 3.

As illustrated in FIG. 4, the direction angle $\theta$ refers to an angle of rotation of a line which connects (i) an intersecting point of a perpendicular line perpendicularly drawn from a point of view and a plane which includes the surface of the second polarizing plate 13 and (ii) the center 13c of the second polarizing plate 13. In the example shown in FIG. 4, it is assumed that the direction angle $\theta$ from the point of view $P_1$ is 0°, and that the direction angle $\theta$ increases clockwise when viewed from the upper side in the normal direction of the second polarizing plate 13. According to the example shown in FIG. 4, the point of view $P_2$ has a direction angle $\theta_2$ of 90°, and the point of view $P_3$ has a direction angle $\theta_3$ of 180°. The polar angle $\Phi$ is an angle defined by (i) a line which connects the center 13c of the second polarizing plate 13 and a point of view and (ii) the normal of the second polarizing plate 13.

With reference to (a) through (c) of FIG. 5, the following description deals with displaying states, which are viewed from the points of view $P_1$ through $P_3$ shown in FIG. 4, respectively, obtained in the case where, as shown in (a) of FIG. 3, the voltage $V_L$ applied to the liquid crystal cell 21 has caused the molecular long axes of the liquid crystal molecules 21c to be slightly slanted with respect to the normals of the light-transmitting substrates 21a and 215.

With regard to the viewing angle from the point of view $P_1$ in FIG. 4 (direction angle $\theta_1=0°$), the short axis of the liquid crystal molecule 21c faces the point of view $P_1$ in the viewing angle direction (see (a) of FIG. 5)). In consequence of this, with regard to the viewing angle from the point of view $P_1$, linearly polarized light, generated from light which has been emitted from the backlight 3, passed through the third polarizing plate 22, and been entered into the liquid crystal cell 21, is blocked by the second polarizing plate 13, because the linearly polarized light is not subjected to birefringence caused by the liquid crystal molecules 21c. This causes a black display to be carried out with regard to the viewing angle from the point of view $P_1$ (direction angle $\theta_1=0°$). When the voltage $V_L$ applied to the liquid crystal cell 21 is in the range from 2.5 V to 3.5 V as described above, it is possible to obtain a blocking state in which it is possible to sufficiently prevent a display from being seen by other people for a polar angle $\Phi$, as shown in FIG. 6, falling in the range of $30°\leq\Phi<90°$ with regard to the direction angle $\theta_1=0°$. In FIG. 6, $L_1$ to $L_8$ are coordinate lines indicative of viewing angle distributions for luminances of 50 cd/m², 100 cd/m², 150 cd/m², 200 cd/m², 250 cd/m², 300 cd/m², 350 cd/m², and 400 cd/m², respectively.

With regard to the viewing angle from the point of view $P_2$ in FIG. 4 (direction angle $\theta2=90$), the long axis of the liquid crystal molecule 21c is slightly slanted with respect to each of the polarizing transmission axis $X_{22}$ of the second polarizing plate 13 and the polarizing transmission axis $X_{23}$ of the third polarizing plate 22 (see (b) of FIG. 50). In consequence of this, with regard to the angle from the point of view $P_2$, a linearly polarized light, generated from light which has been emitted from the backlight 3, passed through the third polarizing plate 22, and been entered into the liquid crystal cell 21, is blocked by the second polarizing plate 13, although the linearly polarized light is subjected to a very small birefringence caused by the liquid crystal molecules 21c. This also causes a black display to be carried out with regard to the viewing angle from the point of view $P_2$ (direction angle $\theta_2=90°$). Further, with regard to a point of view opposite to the point of view $P_2$, i.e., in a case of direction angle $\theta$ of 270°, a black display is carried out because of the same principle as in the case of the point of view $P_2$. When the voltage $V_L$ applied to the liquid crystal cell 21 is in the range from 2.5 V to 3.5 V as described above, it is possible to obtain a blocking state in which it is possible to sufficiently prevent a display from being seen by other people for a polar angle $\Phi$ is, as shown in FIG. 6, falling in the range of $30°\leq\Phi<90°$ with regard to the direction angle $\theta=90°$ and the direction angle $\theta=270°$.

With regard to the viewing angle from the point of view $P_3$ in FIG. 4 (direction angle $\theta_3=180°$), (i) the molecular long axis of the liquid crystal molecule 21c is slanted approximately 45 degrees with respect to each of the polarizing transmission axis $X_{13}$ of the second polarizing plate 13 and the polarizing transmission axis $X_{22}$ of the third polarizing plate 22 and (ii) the long axis of the liquid crystal molecule 21c faces the point of view $P_3$ in the angle direction (see (c) of FIG. 5). In consequence, with regard to the viewing angle from the point of view $P_3$, linearly polarized light, generated from light which has been emitted from the backlight 3, passed through the third polarizing plate 22, and been entered into the liquid crystal cell 21, is caused to rotate its polarization direction so that the polarization direction coincides with the polarizing transmission axis of the second polarizing plate 13, because the linearly polarized light is subjected to birefringence caused by the liquid crystal molecules 21c. The linearly polarized light then passes through the second polarizing plate 13. This causes a good display to be carried out with respect to the viewing angle from the point of view $P_3$. When the voltage $V_L$ is in the range from 2.5 V to 3.5 V as described above, it is possible to obtain a good display for a polar angle $\Phi$ falling in the range of $0°\leq\Phi<90°$ with regard to the direction angle $\theta_3=180°$ (see FIG. 6).

As described above, when the liquid crystal cell 21 of the viewing angle control panel 2 receives the voltage $V_L$ causing the molecular long axis of the liquid crystal molecule 21c to be slightly slanted with respect to the normals of the substrates, a good display is obtained only in a narrow viewing angle range in the vicinity of the direction angle $\theta$ of 180°. With regard to other direction angles, the polarized light in the liquid crystal cell 21 is blocked by the second polarizing plate 13. This causes a black display to be carried out. In other words, when applying the voltage $V_L$ to the liquid crystal cell 21 of the viewing angle control panel 2, it is possible to block the light emitted from the backlight 3 in the wide viewing angle direction. As a result, it is impossible to view an image displayed on the liquid crystal display panel 1 in the wide viewing angle direction. This allows the liquid crystal display 10 to have a narrow viewing angle.

As shown in (b) of FIG. 3, when the liquid crystal cell 21 of the viewing angle control panel 2 receives the voltage $V_H$ causing the molecular long axis of the liquid crystal molecule 21c to be slanted so as to be substantially parallel to the substrates, it is possible for the liquid crystal display 10 to have a wide viewing angle with respect to any of the viewing angle from the points of view $P_1$ through $P_3$ shown in FIG. 4. This is because birefringence occurs so sufficiently that a good display can be carried out with regard to any direction angle θ, as shown in FIG. 7. In FIG. 7, $L_1$ through $L_8$ are coordinate lines indicative of viewing angle distributions for luminances of 130 cd/m$^2$, 240 cd/m$^2$, 350 cd/m$^2$, 460 cd/m$^2$, 570 cd/m$^2$, 680 cd/m$^2$, 790 cd/m$^2$, and 900 cd/m$^2$, respectively.

According to the liquid crystal display 10 of the present embodiment, it is possible to switch the display states of the liquid crystal display 10 between the wide viewing angle and the narrow viewing angle, by switching the voltages applied to the liquid crystal cell 21 of the viewing angle control panel 2 between at least two voltages, i.e., the voltage $V_L$ and the voltage $V_H$.

As shown in FIG. 8, the viewing angle control panel 2 of the present invention may also be arranged so as to further include a retardation film 4 between the light-transmitting substrate 21a of the liquid crystal cell 21 and the third polarizing plate 22. In a case where the voltage $V_L$ is applied to the liquid crystal cell 21 so that the liquid crystal display 10 has a narrow viewing angle, when viewed from a viewing angle other than the direction angle θ in the vicinity of 180° shown in FIG. 4 (e.g., with regard to direction angles θ in the order of 0°, 90°, and 270°, respectively), linearly polarized light, generated from light which has been emitted from the backlight 3 and passed through the third polarizing plate 22, becomes elliptically polarized light. This is because birefringence is caused in the liquid crystal layer of the liquid crystal cell 21 due to the refractive index ($n_e$, $n_o$) of the liquid crystal molecules 21c. This causes a leakage of light because the light partially passes through the second polarizing plate 13. The retardation film 4 is provided so as to optically compensate the elliptically polarized light. Specifically, a retardation film is used as the retardation film 4 causing an occurrence of elliptically polarized light that cancels out the elliptically polarized light generated in the liquid crystal layer of the liquid crystal cell 21 in the narrow viewing angle mode. Three-dimensional refractive index axes $N_X$, $N_Y$ and $N_Z$ of the retardation film 4 are defined as in FIG. 8. Specifically, a three-dimensional refractive index axis $N_X$ is a component perpendicular to the polarizing transmission axis $X_{13}$ of the second polarizing plate 13; the three-dimensional refractive index axis $N_Y$ is a component parallel to the polarizing transmission axis $X_{13}$ of the second polarizing plate 13; and the three-dimensional refractive index axis $N_Z$ is a component parallel to the normal of the second polarizing plate 13.

As illustrated in FIG. 2, the liquid crystal display 10 described above includes the viewing angle control panel 2 disposed below the liquid crystal display panel 1. However, the present embodiment is not limited to this. The liquid crystal display panel 1 and the viewing angle control panel 2 may be stacked in the reverse order. Specifically, it may be such that the liquid crystal display panel 1 is provided on an upper side of the backlight 3, and that the viewing angle control panel 2 is disposed on the liquid crystal display panel 1. Further, in this case, the liquid crystal display panel 1 may be a semi-transmissive liquid crystal panel.

The effect of privacy display is more significant in a privacy display mode, when the viewing angle control panel 2 is used under an environment in which the liquid crystal display 10 is exposed to external light. In other words, it is possible to more enhance the blocking effect when the viewing angle control panel 2 is used under an environment in which the liquid crystal display 10 is exposed to external light. This is because a greater amount of external light causes an increase in amount of external light reflected in the liquid crystal display panel 1. This consequently causes light used for display, which is emitted from the backlight 3, to be less visible. This is based on the same principle as the one that a display on the screen of a portable phone is invisible in an outdoor environment in which the portable phone is exposed to external light.

The following description explains in detail a mechanism of the image visibility, with reference to (a) and (b) of FIG. 9.

In (a) of FIG. 9, the luminance of a white display portion and a black display portion of the liquid crystal display panel 1 are indicated by A and B, respectively. A greater contrast ratio A/B results in better visibility. In view of this, the liquid crystal display panel 1 is irradiated by reflected light C so that the display is less likely to be visible as shown in (b) of FIG. 9, for example. The closer to 1 the contrast ratio of (A+C) to (B+C) becomes, the less the display is likely to be visible. In other words, the greater amount the reflected light C has, the less visible the display becomes.

Figure 1:
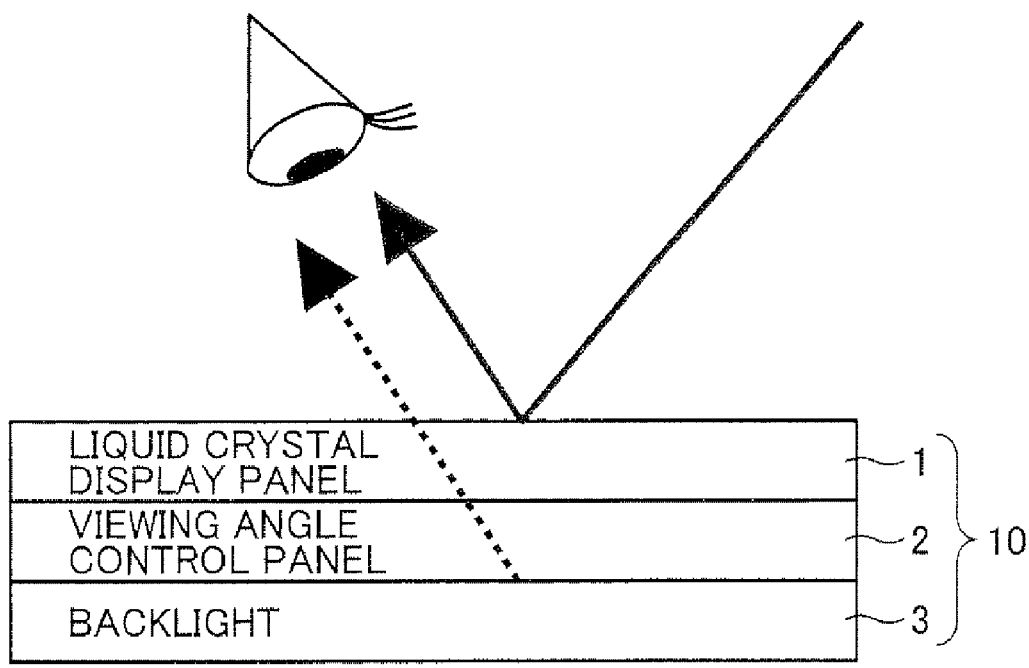
FIG. 1 is a schematic view of a display system in accordance with an embodiment.

In view of the mechanism of image visibility, the display system of the present embodiment including the liquid crystal display 10 further includes a reflected light amount relative increasing section (not shown). With the reflected light amount relative increasing section, it is ensured that the amount of external light reflected in the liquid crystal display 10 is relatively larger than the amount of light leaked from the backlight 3 as shown in FIG. 1, at least in case of a privacy mode display, i.e., a narrow viewing angle mode. Note that the "light leaked from the backlight 3" refers to light that has transmitted the backlight 3 and contributes to a display on a surface of the liquid crystal display panel 1. The light leaked from the backlight 3 has nothing to do with whether the light is leaked from a white display portion or a black display portion. This allows a reduction in the visibility of a display on the liquid crystal display panel 1. As such, it is possible to provide a display system which is capable of enhancing a blocking effect and an effect of a narrow viewing angle. The effects brought about by the arrangement has been visually confirmed. Further, the effects are not necessarily limited to the narrow viewing angle mode. Namely, those effects are also brought about by the wide viewing angle mode. It should be noted that the effects are more significant in the narrow viewing angle mode than in the wide viewing angle mode. For example, FIG. 6 is a chart showing a luminance distribution in the narrow viewing angle mode. According to the chart, a greater part in the luminance distribution is occupied by a blocking region having a display luminance of 50 cd/m$^2$ or less. Note however that this does not indicate that the display luminance of this blocking region is 0 cd/m$^2$.

According to the present embodiment, the display luminance of the blocking region is preferably 10 cd/m$^2$ or less in the narrow viewing angle mode.

According to the present embodiment, it is possible to light, around the liquid crystal display 10, a light 31 which is provided for increasing the amount of reflected light in the liquid crystal display 10 by increasing illuminance which the liquid crystal display 10 receives (see FIG. 10(a), for example). This allows the amount of light reflected in and around the liquid crystal display 10 to be relatively larger than the amount of light leaked from the backlight 3. The light 31 is provided in a lighting section (not shown) of the display system.

Specifically, the light 31 may be provided on at least one of the four sides, i.e., any of a top side, a bottom side, a right side, and a left side, which surround the liquid crystal display 10. Alternatively, the light 31 may be provided on all the four sides surrounding the liquid crystal display 10. The light 31 is turned on by the lighting section (not shown) of the display system. The above arrangement ensures that the amount of external light reflected in and around the liquid crystal display 10 is relatively larger than the amount of light leaked from the backlight 3.

For example, a front light 32 serving as the light of the lighting section may be provided so as to face a viewer using the liquid crystal display 10, as shown in FIG. 10 (*b*).

Since the front light 32 is provided in front of a viewer, reflected light caused by the front light 32 or by the light 31 prevents visibility of a display of the liquid crystal display 10 to a person present behind the viewer using the liquid crystal display 10.

The liquid crystal display 10 of the present embodiment may include a touch panel 5, as shown in FIG. 10 (*a*), provided on the front surface of the liquid crystal display panel 1. A signal can be supplied when part of the touch panel 5 is touched. When an operator of the liquid crystal display 10 touches the touch panel 5, the light 31 can be turned on.

The liquid crystal display 10 including the touch panel 5 is, for example, provided in an automatic teller machine (ATM) of a bank. When an operator touches the touch panel 5 to use the liquid crystal display 10, the light 31 is turned on. This allows a display content made by the operator of the liquid crystal display 10 not to be seen by other people.

As shown in FIG. 11, the display system of the present embodiment may include, for example, an infra-red sensor 41 serving as a human sensor for sensing the presence of a person. This allows the light 31 or the front light 32 to be turned on when the infra-red sensor 41 senses the presence of a person.

The infra-red sensor 41 is provided, for example, on the ceiling, and includes an infra-red radiation emitting section and an infra-red radiation receiving section (not shown). The presence of a person is sensed when the infra-red radiation receiving section receives reflected light of the infra-red radiation which is emitted by the infra-red radiation emitting section. Specifically, the presence of a person is sensed as a change in intensity of the reflected light.

This allows the light 31 or the light 32 to be turned on when the infra-red sensor 41 senses the presence of a person. The light 31 or the front light 32 is turned on when an operator of the liquid crystal display 10 is present, so that the amount of external light reflected in the liquid crystal display 10 is relatively larger than the amount of light leaked from the backlight 3. The human sensor may alternatively be a sensor sensing electromagnetic wave or a sensor sensing visible light, for example.

As shown in FIGS. 12 (*a*) and 12 (*b*), the infra-red sensor 41 may be provided, for example, in an ATM 50 of a bank so as to directly sense an operator of the liquid crystal display 10 in the ATM 50. FIG. 12 (*a*) shows the infra-red sensor 41 provided in an upper part of the ATM 50, whereas FIG. 12 (*b*) shows the infra-red sensor 41 provided in a lower part of the ATM 50. The infra-red sensor 41 provided in the lower part of the ATM 50 is effective when, for example, the operator is in a wheelchair.

The infra-red sensor 41 is not necessarily of a reflective type. As shown in FIGS. 13 (*a*) and 13 (*b*), an infra-red sensor 43 may be, for example, of a transmissive type. The infra-red sensor 43 includes: an infra-red radiation emitting section (not shown) provided on a pole 42*a* on one side; and an infra-red radiation receiving section 43*a* provided on a pole 42*b* on the other side. As shown in FIG. 13 (*a*), for example, the poles 42*a* and 42*b* may be positioned so as to sense an operator of the liquid crystal display 10 in the ATM 50. This allows directly sensing an operator of the liquid crystal display 10 in the ATM 50.

Alternatively, as illustrated in FIG. 13 (*b*), the poles 42*a* and 42*b* may be positioned so as to sense a person present behind an operator of the liquid crystal display 10 in the ATM 50.

Alternatively, as shown in FIG. 14 (*a*), for example, the presence of a person may be sensed by insertion of a cash card 51 for operating the ATM 50 into the ATM 50.

Alternatively, as illustrated in FIG. 14 (*b*), a footboard 52 for sensing a person may be provided at a position where an operator of the liquid crystal display 10 in the ATM 50 would stand. The footboard 52 senses the weight of a person standing on the footboard 52. The panel 52 for sensing a person incorporates a piezoelectric device (not shown), for example. When a person stands on the panel 52 for sensing a person, the piezoelectric element senses the pressure. The panel 52 for sensing a person thereby senses the presence of a person.

Alternatively, as shown in FIGS. 15 (*a*) and 15 (*b*), the display system of the present embodiment may include an illuminance meter 61, serving as an ambient illuminance sensor, for sensing the ambient illuminance of the liquid crystal display 10. When the illuminance sensed by the illuminance meter 61 is not more than a set value, the light 31 or the front light 32 is turned on. FIG. 15 (*a*) shows the illuminance meter 61 provided on the ATM 50. According to this arrangement, the illuminance meter 61 senses the ambient illuminance of the liquid crystal display 10. FIG. 15 (*b*) shows an illuminance meter 61 provided in a room in which the ATM 50 is provided. According to this arrangement, the illuminance meter 61 senses the illuminance of external light in the room, and thus can be operated in conjunction with the weather of the day, for example. In cases of these arrangements, a threshold value is preset to a predetermined illuminance. When the illuminance sensed by the illuminance meter 61 is less than the threshold value, the turning on of the light 31 or the front light 32 is controlled.

With the arrangement, when it becomes dark in the ambient environment, the illuminance sensed by the illuminance meter 61 becomes not more than a predetermined value. This causes the light 31 or the front light 32 to be turned on.

When it becomes dark in the ambient environment, for example, early in the evening, and visibility of the liquid crystal display 10 therefore becomes better, the light 31 or the front light 32 is turned on, so that the amount of external light reflected in the liquid crystal display 10 is relatively larger than the amount of light leaked from the backlight 3.

In the above description, for example, the light 31 or the front light 32 is provided as a method of causing the amount of external light reflected in the liquid crystal display 10 to be relatively larger than the amount of light leaked from the backlight 3.

However, the present embodiment is not necessarily limited to this. For example, instead of turning on the light 31 or the front light 32, the luminance of the backlight 3 may be reduced. The reduction in the luminance of the backlight 3 is carried out by a backlight luminance reducing section (not shown) of the display system.

A reduction in luminance of the backlight 3 allows the amount of external light reflected in the liquid crystal display 10 to be relatively larger than the amount of light leaked from the backlight 3.

Alternatively, the display system of the present embodiment may for example, include a reflective plate 71, a reflective sheet 72, or an aluminum member 73, each serving as a reflective member for increasing the amount of light to which the liquid crystal display 10 is exposed, in at least a part of the area surrounding the liquid crystal display 10, as shown in FIG. 16 (a), 16(b) or 16 (c), respectively.

Since the reflective member is provided in at least a part of the area surrounding the liquid crystal display 10, the luminance of light to which the liquid crystal display is exposed is increased. Consequently, the amount of light reflected in and around the liquid crystal display 10 can be increased. This further improves the effect of turning on the light or reducing the luminance of the backlight 3 so that the amount of external light reflected in and around the liquid crystal display 10 to be relatively larger than the amount of light leaked from the backlight 3.

Specifically, as illustrated in FIG. 16 (a), the reflective plate 71 may be provided so as to be erected around the ATM 50, for example. The reflective plate 71, which takes the form of a single-leaf screen, is capable of facing the liquid crystal display 10 at a variable angle so as to collect light toward the liquid crystal display 10. This allows preventing a display of the liquid crystal display 10 from being, visible from a desired angle. In this kind of arrangement, the reflective plate 71 is not necessarily capable of facing the liquid crystal display 10 at a variable angle. For example, the reflective plate 71 may be disposed on the ceiling.

Further, as illustrated in FIG. 16 (b), the reflective sheet 72 serving as a reflective member may be provided so as to face a viewer using the liquid crystal display 10. This causes external light to be reflected by the reflective sheet 72 provided so as to face the viewer using the liquid crystal display 10. As a result, light reflected by the reflective sheet 72 prevents a person present behind the viewer using the liquid crystal display 10 from viewing a display of the liquid crystal display 10, for example.

As illustrated in FIG. 16 (c), the aluminum member 73 serving as a reflective member may be provided so as to surround the liquid crystal display 10, in combination with the front light 32. This further increases illuminance which the liquid crystal display 10 receives. In addition, the reflective member is not necessarily limited to the aluminum member 73. For example, the surface of the ATM 50 may be plated with a reflective material such as silver or aluminum so as to further reflect light.

Further, the first polarizing plate 12 provided on the front surface of the liquid crystal display 10 illustrated in FIG. 2 may preferably be a polarizing plate that has been subjected to a diffusion treatment. Specifically, The upper polarizing plate 12 for the liquid crystal panel preferably has a surface which has been subjected to a diffusion treatment such as an anti-glare (AG) treatment. The AG treatment refers to a treatment for prevention of glare (reflection), and is one of methods for preventing, for example, specular reflection on a surface such as a glass surface. The AG treatment may be realized, for example, by roughening the surface of the first polarizing plate 12 to a small degree or by attaching a rough-surfaced film to the surface of the upper polarizing plate 12. This can avoid, for example, that a background is displayed.

As a result, the narrowing of a viewing angle by the viewing angle control panel 2 is enhanced, as compared to the case in which the first polarizing plate 12 is a polarizing plate that has not been subjected to a diffusion treatment.

According to the above arrangement, use of a liquid crystal cell having liquid crystal molecules aligned vertically allows the narrow viewing angle mode to be achieved in which mode visibility of a display is limited to a particular viewing angle. Unlike the conventional art of controlling a viewing angle in which art the contrast of a display is decreased in a wide viewing angle direction, the viewing angle can be controlled by switching from transmitting of light to blocking of light and vice versa. Consequently, it is possible to cause the amount of external light reflected in the liquid crystal display 10 to be relatively larger than the amount of light leaked from the backlight 3, even in a case where the mode is switched into the narrow viewing angle mode. This allows enhancement of blocking effect.

In the display system of the present example embodiment presented herein, the display panel is preferably a liquid crystal display panel 1. The liquid crystal display panel 1 may be a transmissive liquid crystal display panel, a reflective liquid crystal display panel, or a semi-transmissive liquid crystal display panel.

As a result, it is possible to provide a display system that includes a liquid crystal display panel capable of enhancing a blocking effect.

In a display system of the present embodiment, it is possible to diversely combine at least two of lighting, reduction in luminance of the backlight, provision of the front light, the reflective sheet, and the reflective plate.

The present technology is applicable to a display system including a display device such as a liquid crystal display that includes a backlight, a display panel, and a viewing angle control panel for controlling a viewing angle of the display panel. The liquid crystal display may be a display such as a transmissive liquid crystal display, a reflective liquid crystal display, or a semi-transmissive liquid crystal display.

The invention claimed is:

1. A display system comprising a display device, said display device comprising:
    a backlight;
    a liquid crystal display panel; and
    a separate viewing angle control liquid crystal panel for controlling a viewing angle of the liquid crystal display panel,
    said display system further comprising
    a reflected light amount relative increasing section for increasing an illuminance of external light to be received at the display device, so as to cause an amount of the external light reflected in the display device to be relatively larger than an amount of light leaked from the backlight in the display device, which amount of the light is obtained after the light has been transmitted through the liquid crystal display panel and the separate viewing angle control liquid crystal panel, the reflected light amount relative increasing section including a lighting section for turning on a light for increasing the amount of light reflected in the display device, the lighting section including the light provided on at least one of four sides surrounding, along a display surface of the display device, the display surface.

2. The display system according to claim 1, wherein the display device further includes a touch panel which is provided on a front surface of the display panel and which allows signal input to be entered when part of the touch panel is touched, and
    the lighting section turns on the light when the tough panel is touched.

3. The display system according to claim 1, wherein the reflected light amount relative increasing section includes a human sensor for sensing presence of a person, and the lighting section turns on the light when the human sensor senses presence of a person.

4. The display system as set forth in claim 3, wherein the human sensor senses the presence of a person with use of infra-red radiation.

5. The display system according to claim 4, wherein the human sensor senses presence of a person operating the display device.

6. The display system according to claim 4, wherein the human sensor senses presence of a person present behind a person operating the display device.

7. The display system according to claim 1, wherein the display device is provided in a cash dispenser, and the lighting section turns on the light when a cash card is inserted in the cash dispenser.

8. The display system according to claim 1, wherein the reflected light amount relative increasing section further includes an ambient illuminance sensor for sensing ambient illuminance of the display device, and the lighting section turns on the light when illuminance sensed by the ambient illuminance sensor is not more than a set value.

9. The display system according to claim 1, wherein the reflected light amount relative increasing section further includes an ambient illuminance sensor for sensing ambient illuminance of the display device, and a backlight luminance reducing section in the reflected light amount relative increasing section reduces the luminance of the backlight when illuminance sensed by the ambient illuminance sensor is not more than a set value.

10. The display system according to claim 1, wherein the reflected light amount relative increasing section includes a polarizing plate, provided on a front surface of the display device, which has been subjected to a diffusion treatment.

11. The display system as set forth in claim 1, wherein the reflected light amount relative increasing section further includes, in at least a part of an area surrounding the display device, a reflective member for increasing the amount of light reflected in the display device.

12. The display system according to claim 11, wherein the reflective member is provided so as to face a viewer using the display device.

13. The display system according to claim 11, wherein the reflective member is a reflective plate which faces, at a variable angle, the display device.

14. The display system according to claim 1, wherein
the viewing angle control panel includes:
a liquid crystal cell comprising:
a pair of transparent substrates; and
a liquid crystal layer provided between the transparent substrates, the liquid crystal layer having liquid crystal molecules aligned vertically, and
a driving circuit for applying a voltage to the liquid crystal layer,
the liquid crystal cell being provided between two polarizing plates which are provided to face each other so that polarizing transmission axes are substantially at right angle, and
the driving circuit changes an alignment of the liquid crystal molecules in the liquid crystal layer of the liquid crystal cell so that a display state is switched between a first viewing angle range and a second viewing angle range which is within the first viewing angle range and is narrower than the first viewing angle range.

15. The display system as set forth in claim 1, wherein a human sensor in the reflected light amount relative increasing section senses the presence of a person with use of infra-red radiation.

16. The display system according to claim 15, wherein the human sensor senses presence of a person operating the display device.

17. The display system according to claim 15, wherein the human sensor senses presence of a person present behind a person operating the display device.

* * * * *